US012718314B2

(12) United States Patent
Fries et al.

(10) Patent No.: US 12,718,314 B2
(45) Date of Patent: Aug. 25, 2026

(54) GRAPHICS PROCESSING

(71) Applicant: Arm Limited, Cambridge (GB)

(72) Inventors: Jakob Axel Fries, Lund (SE); Olof Henrik Uhrenholt, Lomma (SE); Wing-Tsi Henry Wong, Lund (SE)

(73) Assignee: Arm Limited, Cambridge (GB)

( * ) Notice: Subject to any disclaimer, the term of this patent is extended or adjusted under 35 U.S.C. 154(b) by 111 days.

(21) Appl. No.: 18/819,003

(22) Filed: Aug. 29, 2024

(65) Prior Publication Data

US 2026/0065407 A1 Mar. 5, 2026

(51) Int. Cl.
*G06T 1/20* (2006.01)

(52) U.S. Cl.
CPC .................................... *G06T 1/20* (2013.01)

(58) Field of Classification Search
CPC ................................ G06T 1/20; G06T 11/40
See application file for complete search history.

(56) References Cited

U.S. PATENT DOCUMENTS 5,142,671 A 8/1992 Isida et al.
5,404,484 A 4/1995 Schlansker et al.
6,243,791 B1 6/2001 Vondran, Jr.
6,701,412 B1 3/2004 McDougall et al.
6,897,858 B1 * 5/2005 Hashimoto ............ H04N 19/44 345/555
8,665,484 B2 * 3/2014 Yamada ................ H04N 1/415 358/1.9
9,104,582 B1 8/2015 Mukundan et al.
10,387,990 B2 * 8/2019 Broadhurst ............ G09G 5/363
10,613,871 B2 4/2020 Choi
10,748,510 B2 * 8/2020 Keramidas .............. G06T 11/40
2006/0277356 A1 12/2006 Speier et al.
2008/0104329 A1 5/2008 Gaither et al.
2011/0131381 A1 6/2011 Kaplan
2012/0254507 A1 10/2012 Chang
2013/0103909 A1 4/2013 Pangborn et al.
2013/0282987 A1 10/2013 Koob
2014/0075125 A1 3/2014 Biswas
2014/0244902 A1 8/2014 Simionescu et al.
2016/0035128 A1 2/2016 Zhao et al.
2018/0301125 A1 10/2018 Haraden
2018/0349291 A1 12/2018 Klingauf
2019/0096027 A1 3/2019 Fielding
2020/0051214 A1 2/2020 Nallam
2020/0379909 A1 12/2020 Uhrenholt
2022/0027281 A1 * 1/2022 Uhrenholt ............ H04N 19/426

(Continued)

OTHER PUBLICATIONS

Combined Search and Examination Report under Sections 17 and 18(3) dated Sep. 25, 2024, GB Patent Application No. GB2405981.8, 5 pages.

(Continued)

*Primary Examiner* — Daniel F Hajnik
*Assistant Examiner* — Joshua Jungwook Suo
(74) *Attorney, Agent, or Firm* — Pearl Cohen Zedek Latzer Baratz LLP

(57) ABSTRACT

A tile-based graphics processing system is disclosed. The system selects a rendering configuration for generating one or more rendering tiles of a render output based on a compression unit size and/or shape that is to be used to encode the one or more rendering tiles of the render output.

19 Claims, 14 Drawing Sheets

(56) References Cited

U.S. PATENT DOCUMENTS

2022/0277411 A1* 9/2022 Wang ........................ G06T 1/60

OTHER PUBLICATIONS

Chen, Chao, et al., "DRAM write-only-cache for improving lifetime of phase change memory," 2016 IEEE 59th International Midwest Symposium on Circuits and Systems (MWSCAS), Oct. 16-19, 2016, 4 pages.

GB Combined Search and Examination Report dated Dec. 3, 2019, GB Patent Application No. GB1907828.6.

GB Combined Search and Examination Report dated Dec. 20, 2021, GB Application No. GB2114513.1.

Preliminary Amendment dated Apr. 25, 2025, U.S. Appl. No. 19/190,070, filed Apr. 25, 2025.

U.S. Appl. No. 19/210,310, filed May 16, 2025.

U.S. Appl. No. 19/190,070, filed Apr. 25, 2025.

Examination Report Under Section 18(3) dated Mar. 23, 2026, UK Patent Application No. GB2405981.8.

* cited by examiner

GRAPHICS PROCESSING

BACKGROUND

The technology described herein relates to computer graphics processing, and in particular to tile-based graphics processing.

Graphics processing operations, which may be performed by a graphics processor (graphics processing unit (GPU)), typically process data in an uncompressed form. When such operations have produced a particular output (such as a tile for render output in a tile-based graphics processing system), the output data may then be written out to a (e.g. frame) buffer, for example in main memory, for storage for further processing (e.g. display of the frame).

In tile-based graphics processing, the two-dimensional graphics processing (render) output (i.e. the output of the rendering process, such as an output frame to be displayed) is generated (rendered) as a plurality of smaller area regions, usually referred to as "tiles". The render output is typically divided (by area) into regularly sized and shaped rendering tiles (they are usually e.g. squares or rectangles). The tiles are each rendered separately (e.g. one after another). The rendered tiles are then combined to provide the complete render output (e.g. frame for display).

To support such operation, a tile-based graphics processor will typically include a set of one or more tile buffers for storing tile data locally to the graphics processor while a tile is being rendered (generated). Then, once a given rendering tile has been completed for a render output, the rendering tile will be written out from the tile buffer to other storage, such as, for example, a (e.g. frame) buffer, for example in main memory.

Once all the tiles for a given render output have been written out to the (e.g. frame) buffer, then the render output can be used for further processing (e.g. provided to a display for display, or otherwise processed).

To reduce the amount of data that needs to be transferred to and stored in memory when performing tile-based graphics processing, the tile data may be stored in a compressed form in the memory.

The Applicants believe there remains scope for improvements to tile-based graphics processing.

BRIEF DESCRIPTION OF THE DRAWINGS

Embodiments of the technology described herein will now be described by way of example only and with reference to the accompanying drawings, in which.

DETAILED DESCRIPTION

Figure 1:
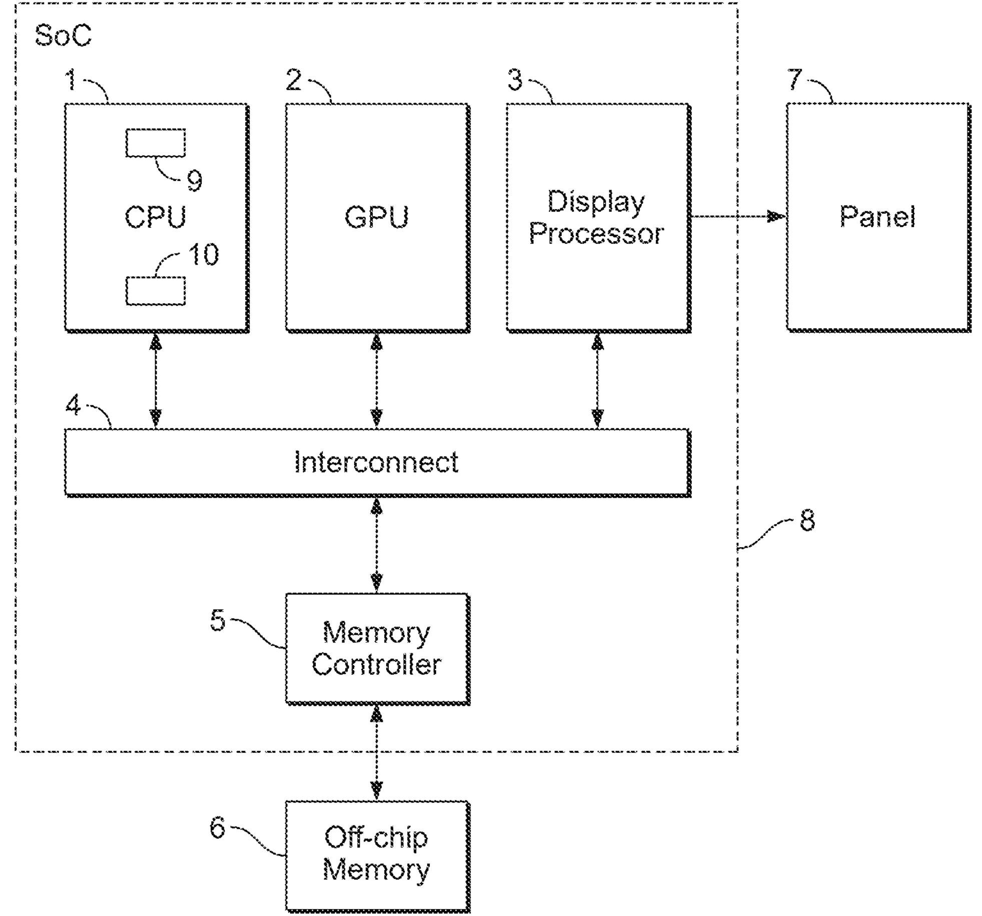
FIG. 1 shows an exemplary graphics processing system in which the technology described herein may be implemented.

A first embodiment of the technology described herein comprises a method of operating a tile-based graphics processing system; the method comprising:

selecting a rendering configuration for generating one or more rendering tiles of a render output based on a compression unit size and/or shape that is to be used to encode the one or more rendering tiles of the render output;

generating the one or more rendering tiles of the render output using the selected rendering configuration; and encoding the one or more rendering tiles of the render output using the compression unit size and/or shape.

A second embodiment of the technology described herein comprises a tile-based graphics processing system comprising:

a configuration circuit configured to select a rendering configuration for generating one or more rendering tiles of a render output based on a compression unit size and/or shape that is to be used to encode the one or more rendering tiles of the render output;

a rendering circuit configured to generate one or more rendering tiles of a render output using a rendering configuration selected by the configuration circuit; and an encoder configured to encode one or more rendering tiles of a render output generated by the rendering circuit using a compression unit size and/or shape that a rendering configuration used by the rendering circuit to generate the one or more rendering tiles of the render output was selected based on (by the configuration circuit).

The technology described herein relates to tile-based graphics processing. Thus, in embodiments, a (the) render output, e.g. frame (image) to be displayed, is generated by (the rendering circuit) separately generating each rendering tile of plural rendering tiles that the render output is divided into, and combining the separately generated rendering tiles. The tile-based graphics processing system should, and in embodiments does, comprise one or more tile buffers for storing tile data while a rendering tile is being generated, wherein once a rendering tile has been completed, it is written out from the tile buffer, e.g. to memory.

In embodiments of the technology described herein, the render output tile data is encoded (compressed) before being written out to memory, and stored in memory in an encoded (compressed) form. In embodiments, block-based compression is used, which encodes compression units (blocks) of uncompressed data having a particular size and/or shape for storing in a compressed format.

In the technology described herein, one or more (e.g. all) rendering tiles of a tile-based render output (e.g. frame) are generated (rendered) using a (tile-based) rendering configuration that is selected based on the (particular) compression unit (block) size and/or shape that is to be used to encode (compress) the one or more rendering tiles (e.g. frame). For example, and in embodiments, a rendering tile size and/or shape, and/or a rendering tile processing order, and/or a rendering tile parallel processing allocation, may be selected based on the compression unit (block) size and/or shape.

As will be discussed in more detail below, the Applicants have found that tailoring the rendering tile rendering configuration to the compression unit encoding configuration can facilitate improved processing efficiency.

It will be appreciated therefore, that the technology described herein can provide improved tile-based graphics processing.

The graphics processing system should, and in embodiments does, comprise a (tile-based) graphics processor (GPU). The graphics processing system may further comprise a host processor, e.g. a central processing unit (CPU). The host processor (e.g. CPU) may execute applications that can require graphics processing by the graphics processor (GPU), and send appropriate commands and data to the graphics processor (GPU) to control it to perform graphics processing operations and to produce graphics processing (render) output required by applications executing on the host processor (CPU).

To facilitate this, the host processor (CPU) in embodiments also executes a driver for the graphics processor (GPU). Thus, in embodiments, the graphics processing system comprises a (tile-based) graphics processor (GPU) that is in communication with a host microprocessor (CPU) that executes a driver for the graphics processor (GPU).

The graphics processing system should, and in embodiments does, (further) comprise a memory system. The memory system may comprise any suitable and desired storage. The memory system may comprise on-chip memory (i.e. on the same chip as the host processor and/or the graphics processor) and/or external memory (i.e. not on the same chip as the host processor and/or the graphics processor). In embodiments, the memory system comprises a main (e.g. external) memory that the host processor and/or graphics processor are in communication with. The memory system may further comprise a cache system, via which the host processor and/or graphics processor can communicate with the main memory.

A (each) operation of the technology described herein may be performed by the graphics processor (GPU), and/or host processor (CPU), and/or another component of the graphics processing system, as appropriate. Correspondingly, a (each) circuit of the technology described herein may form part of the graphics processor (GPU), and/or host processor (CPU), and/or another component of the graphics processing system, as appropriate.

In embodiments, a (the) compression unit (block) size and/or shape that is to be used to encode one or more rendering tiles of a render output is determined by the host processor (CPU), e.g. by the driver for the graphics processor. Alternatively, a (the) compression unit (block) size and/or shape that is to be used to encode one or more rendering tiles of a render output may be determined by the graphics processor, e.g. by inspecting a descriptor for the render output, e.g. generated by the host processor (CPU), e.g. driver for the graphics processor.

A rendering configuration may be selected based on a (determined) compression unit (block) size and/or shape in any suitable and desired manner, e.g. by the host processor (CPU), e.g. driver for the graphics processor (GPU), or by the graphics processor (GPU).

Thus, the configuration circuit may be part of the graphics processor (GPU) and/or host processor (CPU), e.g. the driver, and/or another data processor.

In embodiments, (at least) generating rendering tiles of the render output is performed by a (the) graphics processor (GPU). In embodiments, encoding rendering tiles is (also) performed by a (the) graphics processor (GPU). Thus, in embodiments, (at least) the rendering circuit and/or the encoder is part of a (the) graphics processor (GPU).

Thus, another embodiment of the technology described herein comprises a method of operating a tile-based graphics processor; the method comprising:

generating one or more rendering tiles of a render output using a rendering configuration selected based on a compression unit size and/or shape that is to be used to encode the one or more rendering tiles of the render output; and encoding the one or more rendering tiles of the render output using the compression unit size and/or shape.

Another embodiment of the technology described herein comprises a tile-based graphics processor comprising:

a rendering circuit configured to generate one or more rendering tiles of a render output using a rendering configuration selected based on a compression unit size and/or shape that is to be used to encode the one or more rendering tiles of the render output; and an encoder configured to encode one or more rendering tiles of a render output generated by the rendering circuit using a compression unit size and/or shape that a rendering configuration used by the rendering circuit to generate the one or more rendering tiles of the render output was selected based on.

The rendering circuit and the encoder may comprise separate circuits, or may be at least partially formed of shared processing circuits.

These embodiments can, and in embodiments do, include any one or more or all of the optional features described herein, as appropriate. For example, the graphics processor may (comprise a (the) configuration circuit configured to) select the rendering configuration.

In embodiments of the technology described herein, the graphics processing system/processor is operable to perform tile-based graphics processing, e.g. and in embodiments, in order to generate a render output, such as a frame for display. The graphics processing system/processor should thus, and in embodiments does, generate an overall render output on a tile-by-tile basis. The render output (area) should thus be, and in embodiments is, divided into plural rendering tiles for rendering purposes.

A render output will typically comprise an array of data elements (sampling points) (e.g. pixels), for each of which appropriate render output data (e.g. a set of colour value data) is generated by the graphics processing system/processor. A render output data may comprise colour data, for example, a set of red, green and blue, RGB values and a transparency (alpha, a) value. Where the graphics processor generates plural (e.g. a series of) render outputs, each render output may be generated in accordance with the technology described herein.

The rendering tiles that a render output is divided into for rendering purposes can comprise any suitable and desired region (area) of the render output being generated. The rendering tiles are in embodiments all the same size and shape (i.e. regularly-sized and shaped tiles are in embodiments used), although this is not essential. The tiles are in embodiments rectangular, and in embodiments square (having a particular width and height). Each tile may comprise an appropriate array of contiguous data elements (sampling positions) of the render output, such as 16×16, 32×32 or 64×64 data elements (sampling positions) of the render output.

A rendering tile may be generated (by the rendering circuit) in any suitable manner. In embodiments, the (rendering circuit of the) graphics processor is configured to execute a tile-based graphics processing pipeline to generate rendering tiles of a render output being generated. The (rendering circuit of the) graphics processor may comprise one or more (and in embodiments a plurality of) processing (shader) cores, which are (each) operable to perform graphics processing operations to generate rendering tiles of a render output. In embodiments, the (rendering circuit of the) graphics processor comprises a plurality of processing (shader) cores that can generate different rendering tiles (e.g. of the same render output) at the same time (in parallel).

In embodiments, the rendering circuit (pipeline) includes a rasteriser and a fragment renderer. In embodiments, the rasteriser receives primitives for a rendering tile, rasterises the primitives to fragments, and provides the fragments to the fragment renderer for processing. In embodiments, the fragment renderer is operable to perform fragment rendering to generate rendered fragment data, and may perform any appropriate fragment processing operations in respect of fragments generated by the rasteriser, such as texture mapping, blending, shading, etc.

In embodiments, the tile-based graphics processing system/processor comprises one or more tile buffers for storing rendering tiles of a render output being generated. In embodiments, a tile buffer stores rendered data for a rendering tile being rendered by the (rendering circuit of the) tile-based graphics processing system/processor, until the (rendering circuit of the) tile-based graphics processing system/processor completes the rendering of the rendering tile. In embodiments, rendered fragment data generated by the fragment renderer is written to a tile buffer.

Where the graphics processor comprises one or more (e.g. a plurality of) processing (shader) cores, each processing (shader) core in embodiments comprises a respective tile buffer, configured to store tiles (tile data) that have been generated by that (shader) core. In embodiments, each processing (shader) core of the graphics processor is arranged to write tiles of data that it is processing to its respective (tile) buffer.

A (the) tile buffer should be, and in embodiments is, provided local to (i.e. on the same chip as) a (the) tile-based graphics processor, for example, and in embodiments, as part of RAM that is located on (local to) the graphics processor (chip). The tile buffer may accordingly have a fixed storage capacity, for example corresponding to the data (e.g. for an array or arrays of sample values) that the tile-based graphics processor needs to store for (only) a single rendering tile until the rendering of that tile is completed. In embodiments, a tile buffer is able to store any (and all) tile sizes that the graphics processor may be configured to generate. Thus, the tile buffer is in embodiments able to store a largest tile of data that could be generated by the graphics processor.

Once a rendering tile is completed by (a processing core of) the tile-based graphics processing system/processor, rendered data for the rendering tile in embodiments is written out from the tile buffer to other storage that is in embodiments external to (i.e. on a different chip to) the tile-based graphics processor, such as (a frame buffer in) the (main) memory, for use. The graphics processor in embodiments includes a write-out circuit coupled to the tile buffer for this purpose.

Where the graphics processor comprises one or more (e.g. a plurality of) processing (shader) cores, each processing (shader) core in embodiments comprises a respective write-out unit that is configured to write out tile data from a respective tile buffer (to the memory system). Thus, in embodiments, respective tiles of a render output being generated are stored in a tile buffer as they are being generated, and then written from the tile buffer towards (to) the memory system for storage (by a write-out circuit).

In embodiments, uncompressed tile data that is written out to the memory system (by a write-out circuit) is encoded (by the encoder) using a block-based compression scheme before being stored in the memory system. In embodiments, the block-based compression scheme encodes compression units (blocks) of uncompressed data having a particular size and/or shape for storing in the memory system in a compressed format.

Where the graphics processor comprises one or more (e.g. a plurality of) processing (shader) cores, each processing (shader) core in embodiments comprises a respective encoder that is configured to encode (compress) output tile data (provided by the respective write-out circuit).

An (the) encoder can be configured to use any suitable and desired block-based encoding (compression) technique. The compression scheme may encode data in a lossless or lossy manner, and using variable or fixed-rate compression. The encoder may support and be configured to be able to perform a plurality of different forms of block-based encoding, which may, e.g., and in embodiments, be set in use (e.g. on an output-by-output basis).

The block-based encoding (compression) scheme that an encoder is configured to perform should be, and in embodiments is, configured to compress input blocks (compression units) having a particular size and/or shape. Thus, the input to the encoding process will be a block (a data array) having a particular size and/or shape, which the encoding process will then compress to provide an output compressed data block corresponding to that input (uncompressed) data block.

Thus, for any given render output being generated, each compression unit that is compressed should, and in embodiments does, comprise an appropriate subset of the data elements (positions) of the render output (data array), i.e. corresponding to a particular region of the render output. Correspondingly, the render output is in embodiments divided (for encoding purposes) into non-overlapping and regularly sized and shaped compression units (blocks) (regions).

The compression units (blocks) that are compressed may be any suitable size and shape. In embodiments, they are rectangular (having a particular width and height). The compression units (blocks) may be square, but in embodiments are non-square rectangles.

In embodiments an (the) encoder can be configured and set to compress different sized and shaped input blocks, for example, and in embodiments, on an output-by-output basis. For example, the compression unit size and shape for a render output (or sequence of render outputs) may be set by an application that is using, or by a driver for, the graphics processing system.

While it could be the case that the size and shape of the compression units to be used for a given render output being generated correspond exactly to the size and shape of the rendering tiles that are being generated (in which case each tile may simply be compressed as a respective compression unit), the compression units for a given render output may not match the tile size and/or shape. For example, if the tile size is larger than a compression unit, then each compression unit may comprise a respective part (portion) comprising some but not all of a tile. Conversely, if the tile size is smaller than a compression unit then each compression unit may comprise all and/or respective parts (portions) of a plurality of tiles.

In embodiments, to account for such potential mismatches between compression unit and rendering tile size and/or shape, an accumulation buffer is provided intermediate (in the data path from) a write-out circuit and an encoder. In embodiments, the accumulation buffer receives data of tiles from a tile buffer/write-out unit, and outputs that data to the encoder as data arrays corresponding to the (uncompressed) data array size that the block-based compression scheme of the encoder uses. In other words, the accumulation buffer is in embodiments configured to ensure that the encoder receives an appropriate "complete" block of data (a complete "compression unit") for compressing and writing out to the memory system.

Where the graphics processor comprises one or more (e.g. a plurality of) processing (shader) cores, each processing (shader) core in embodiments comprises a respective accumulation buffer (configured to receive and accumulate data from the respective write-out circuit/tile buffer and provide complete compression units to the respective encoder for encoding).

An (the) accumulation buffer can be configured in any suitable and desired manner. In embodiments an accumulation buffer comprises storage for storing tile data received from a (respective) write-out circuit/tile buffer before that data is provided to an (respective) encoder. In embodiments, the storage for the accumulation buffer is set aside for, and dedicated to, the accumulation buffer, and, e.g., and in embodiments, is not part of (is other than part of) any cache system or cache hierarchy of the graphics processor and memory system.

In embodiments, an (the) accumulation buffer is able to store data for plural, different compression units (that it is accumulating) at the same time. In embodiments, the accumulation buffer maintains a record of the compression units that it is currently storing (accumulating), and keeps track of what data for a (and each) compression unit the accumulation buffer currently stores.

In embodiments, the accumulation buffer is operable to provide data (in the form of complete compression units) to the (respective) encoder (to write data out from the accumulation buffer storage to the encoder) for the encoder to then encode as respective compression units (blocks), and this operation to "evict" a compression unit from the accumulation buffer storage to the encoder for encoding can be triggered in any suitable and desired manner.

In embodiments, data for a compression unit is evicted from the accumulation buffer (to the encoder) when and once the accumulation buffer has accumulated (is storing data for) the entire compression unit in question.

However, the Applicants have recognised that it is possible that not all of a given compression unit may be generated and output via the same tile buffer/write-out circuit (e.g. processing core) of the graphics processor. In this case, a complete compression unit may never be accumulated in the accumulation buffer associated with the tile buffer/processing core in question.

To account for this, in embodiments, it is also possible to trigger the eviction of an "incomplete" compression unit from the accumulation buffer storage (from the accumulation buffer). To facilitate this, in embodiments, data for a compression unit is evicted from the accumulation buffer (to the encoder) in response to an indication that the final piece of tile data (sampling position/pixel) for a given (the) compression unit has been written for the tile buffer (processing core) in question to the accumulation buffer. (As this will then mean that there will be no more data for the compression unit in question provided from the tile buffer/write-out circuit (processing core) in question.)

In embodiments, data for a compression unit may (also) be evicted from the accumulation buffer (to the encoder) when an existing compression unit needs to be evicted, e.g. so as to free up storage for a new compression unit.

Once an eviction process has been triggered, the eviction process can proceed in any suitable and desired manner. In embodiments, the eviction process first determines whether a complete or incomplete compression unit is being evicted. Thus, in embodiments, the eviction process comprises determining for a compression unit to be evicted, whether the accumulation buffer has accumulated (stores) all of the data for that compression unit. In the case where all of the data for the compression unit to be evicted is stored by the accumulation buffer, then the complete compression unit can be, and in embodiments is, provided to the encoder for encoding. In the case where not all of the data for the compression unit to be evicted is stored by the accumulation buffer, in embodiments, the accumulation buffer fetches any missing data that is required for (to complete) the compression unit from the memory system.

Thus, in embodiments, the compression unit eviction process (for sending a compression unit to the encoder) comprises (first) determining for the compression unit to be evicted, whether the accumulation buffer stores all of the data for that compression unit, and in the case that not all of the data for the compression unit to be evicted is stored by the accumulation buffer, the accumulation buffer fetching the missing data for the compression unit (from the memory system), and when it has received the missing data for the compression unit, then providing the complete (entire) compression unit to the encoder for encoding.

Further features of the graphics processor/system/accumulation buffer may be as described in United Kingdom Patent Application Number 2405981.8, the entire contents of which is hereby incorporated herein by reference.

In the technology described herein, a rendering configuration for generating one or more rendering tiles of a render output is selected based on a compression unit size and/or shape that is to be used (by the encoder) to encode the one or more rendering tiles.

A rendering configuration can be any suitable way to generate one or more (e.g. all) rendering tiles of a render output. A rendering configuration should be, and in embodiments is, a rendering tile configuration that defines how one or more (e.g. all) rendering tiles of a render output are to be generated, e.g. in terms of their size and/or shape, processing order, parallel processing allocation, etc. In embodiments, there are plural possible rendering configurations that could be used to generate one or more rendering tiles, and one of the plural possible rendering configurations is selected (and used) based on the compression unit size and/or shape.

The selection of a rendering configuration can be performed in any suitable manner. In embodiments, the selection attempts to reduce the likelihood and/or frequency of triggering the compression unit eviction process in respect of an "incomplete" compression unit. In this regard, the Applicants have recognised that the fetching of missing data in the case of an "incomplete" compression unit eviction process may be particularly resource intensive, and it may therefore be desirable to avoid triggering the eviction of an "incomplete" compression unit where possible.

Thus, in embodiments, selecting a rendering configuration comprises selecting a rendering configuration that will (compared to other rendering configurations of the plural possible rendering configurations) be less likely to cause an (each) accumulation buffer to evict an (any) incomplete compression unit.

Correspondingly, in embodiments, selecting a rendering configuration comprises selecting a rendering configuration that will (compared to other rendering configurations of the plural possible rendering configurations) be more likely to cause an (each) accumulation buffer to provide (one or more) complete compression units to the (respective) encoder without requesting render output data from the memory system.

The likelihood of triggering the eviction of completely accumulated compression units can be increased in any suitable manner.

In embodiments, there are plural possible rendering tile sizes and/or shapes (e.g. widths and/or heights) that the rendering circuit is configured to be able to use to generate one or more rendering tiles, and one of the plural possible rendering tile sizes and/or shapes (e.g. widths and/or heights) is selected (and used) based on the compression unit size and/or shape (e.g. width and/or height).

In embodiments, a rendering tile size and/or shape that is closer to the compression unit size and/or shape than other possible rendering tile sizes and/or shapes is selected. For example, the closest possible rendering tile size and/or shape (e.g. width and/or height) to the compression unit size and/or shape (e.g. width and/or height) may be selected. For example, (where possible) the same size and/or shape (e.g. width and/or height) as the compression units may be selected for the rendering tiles. In embodiments, rectangular rendering tiles may be selected in the case of (e.g. particularly wide) rectangular compression units, and e.g. square rendering tiles may otherwise be selected.

In embodiments, a rendering tile size and/or shape is selected that will (compared to other possible rendering tile sizes and/or shapes) result in a (each respective) rendering tile overlapping fewer (e.g. fewest possible) compression units. In embodiments, a rendering tile size and/or shape is selected that will (compared to other possible rendering tile sizes and/or shapes) result in fewer (e.g. fewest possible) compression units having to be accumulated by the accumulation at the same time. This can reduce the likelihood/frequency of the accumulation buffer running out of storage space and, because of that, triggering eviction of an "incomplete" compression unit.

In embodiments, there are plural possible rendering tile processing orders that the rendering circuit is configured to be able to use to generate rendering tiles, and one of the plural possible rendering tile processing orders is selected (and used) based on the compression unit size and/or shape (e.g. width and/or height). For example, and in embodiments, the graphics processor can generate rendering tiles in Morton (Z) order or in raster (line-by-line) order, and Morton (Z) order or raster (line-by-line) order is selected.

In embodiments, a rendering tile processing order is selected that (compared to other possible rendering tile processing orders) more closely (e.g. most closely) matches the compression unit size and/or shape. In embodiments, a rendering tile processing order is selected that will (compared to other possible rendering tile processing orders) result in the rendering tiles that overlap a (each) compression unit being processed closer together (in the order), e.g. consecutively/successively, one after the other. For example, raster (line-by-line) order may be selected in the case of (e.g. particularly wide) rectangular compression units, and e.g. Morton (Z) order may otherwise be selected.

In embodiments, a rendering tile processing order is selected that will (compared to other possible rendering tile processing orders) result in fewer (e.g. fewest possible) compression units having to be accumulated by the accumulation at the same time. This can reduce the likelihood/frequency of the accumulation buffer running out of storage space and, because of that, triggering eviction of an "incomplete" compression unit.

To facilitate these embodiments, rendering tiles may be issued (to the graphics processor) in the selected processing order, and the processing (and subsequent writing out) of the rendering tiles may be forced to finish in the issued order.

In embodiments, different regions ("metatiles") of a render output are assigned to different processing cores of the graphics processor for processing (e.g. in parallel), and the size and/or shape of those rendering regions (and thus the allocation of rendering tiles to different processing cores) is selected based on the size and/or shape of the compression units.

The rendering regions can be any suitable regions of the render output. In embodiments, the render output is divided (for processing purposes) into non-overlapping and regularly sized and shaped rendering regions. In embodiments, each such rendering region encompasses a respective set of one or more (e.g. plural) contiguous rendering tiles of the render output. The rendering regions are thus, in embodiments, rectangular, and in embodiments square (having a particular width and height).

In embodiments, there are plural possible rendering region sizes and/or shapes (e.g. widths and/or heights) that the rendering circuit is configured to be able to use, and one of the plural possible rendering region sizes and/or shapes (e.g. widths and/or heights) is selected (and used) based on the compression unit size and/or shape (e.g. width and/or height).

In embodiments, a rendering region size and/or shape is selected that will result in a (each respective) rendering region overlapping one or more complete compression units. Thus, in embodiments, the rendering region size and/or shape is selected such that a (each respective) processing core will generate a (respective) region of the render output that encompasses one or more complete compression units. For example, rectangular rendering regions may be selected in the case of (e.g. particularly wide) rectangular compression units, and e.g. square rendering regions may otherwise be selected. This can avoid an accumulation buffer not accumulating all data for a complete compression unit, because of that, triggering eviction of an "incomplete" compression unit.

The above describes the main elements and operation of the graphics processor and graphics processing pipeline that are relevant to operation in the manner of the technology described herein.

As will be appreciated by those skilled in the art, the graphics processor can otherwise include and execute, and in embodiments does include and execute, any one or one or more, and in embodiments all, of the processing stages and circuits that graphics processors and graphics processing pipelines may (normally) include.

In embodiments, the graphics processor comprises, and/or is in communication with a memory system, one or more memories, and/or memory devices that store the data described herein, and/or that store software for performing the processes described herein. The graphics processor may also be in communication with a host microprocessor, and/or with a display for displaying images based on the output of the graphics processor.

The output being generated may comprise any output that can and is to be generated by the graphics processor and processing pipeline. The technology described herein can be used for all forms of output that a graphics processor and processing pipeline may be used to generate, such as frames for display, render-to-texture outputs, etc. In embodiments, the output is an output frame, and in embodiments an image.

In embodiments, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described with reference to the drawings.

FIG. 1 shows an exemplary system on chip (SoC) graphics processing system 8 that comprises a host processor comprising a central processing unit (CPU) 1, a graphics processor (GPU) 2, a display processor 3, and a memory controller 5. As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display.

Figure 2:
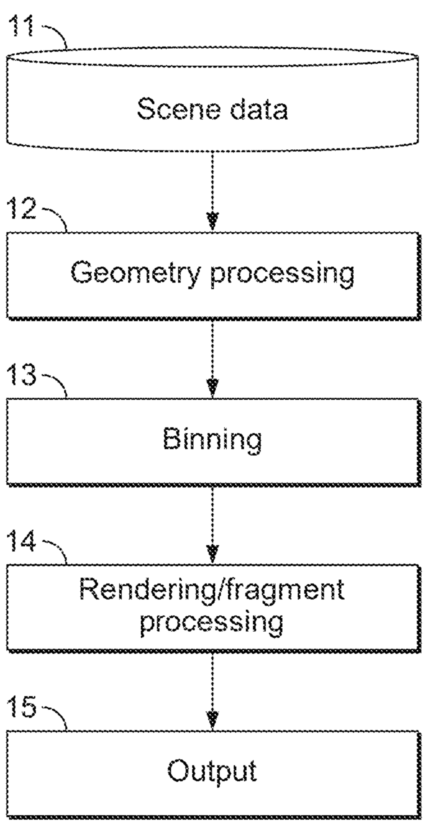
FIG. 2 shows an exemplary graphics processing pipeline.

FIG. 2 shows schematically the processing sequence of the graphics processing pipeline executed by the graphics processor 2 when generating an output in the present embodiments.

FIG. 2 shows the main elements and pipeline stages. As will be appreciated by those skilled in the art there may be other elements of the graphics processor and processing pipeline that are not illustrated in FIG. 2. It should also be noted here that FIG. 2 is only schematic, and that, for example, in practice the shown pipeline stages may share significant hardware circuits, even though they are shown schematically as separate stages in FIG. 2. It will also be appreciated that each of the stages, elements and units, etc., of the processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, for an output to be generated, a set of, e.g. scene data 11, including, for example, and inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in embodiments, by storing it in the memory 6 from where it can then be read by the graphics processor 2.

This scene data 11 may be provided by the application (and/or the driver in response to commands from the application) that requires the output to be generated, and may, for example, comprise the complete set of vertices, indices, etc., for the output in question, or, e.g., respective different sets of vertices, sets of indices, etc., e.g. for respective draw calls to be processed for the output in question. Other arrangements would be possible.

There is then a geometry processing stage or stages 12, which performs appropriate geometry processing of and for the scene data to generate the data that will then be required for rendering the output. This geometry processing 12 can comprise any suitable and desired geometry processing that may be performed as part of a graphics processing pipeline.

In the present embodiments, this geometry processing 12 comprises at least performing vertex processing (vertex shading) of attributes for vertices to be used for primitives for the render output being generated. In particular, appropriate vertex position shading is performed to transform the positions for the vertices from the, e.g. "model" space in which they are initially defined, to the, e.g., "screen", space that the output is being generated in. In embodiments, the vertex shading also comprises generating and/or processing other, non-position attributes of vertices (varyings/varying shading). It would also be possible for some or all the varying shading to be deferred from the geometry processing 12 and, for example, to be triggered at the binning or rendering stages instead, if desired.

As well as appropriate vertex shading, the geometry processing 12 may comprise any other form of geometry processing that is desired, such as one or more of tessellation shading, transform feedback shading, mesh shading, or task shading. This geometry shading may also generate and/or process attributes for vertices, and/or it may process and generate attributes for primitives as well.

Once the desired geometry processing 12 has been performed, there is then, in the present embodiments, as shown in FIG. 2, a binning/tiling stage 13. The graphics processor 2 in the present embodiments is a tile-based graphics processor and so generates respective output tiles of an overall output (e.g. frame) to be generated separately to each other, with the set of tiles for the overall output then being appropriately combined to provide the final, overall output.

The binning process 13 operates to generate appropriate data structures for determining which primitives need to be processed for respective rendering tiles of the output being generated. For example, it may sort the primitives into appropriate primitive lists, which indicate the primitives to be processed for respective tiles or sets of tiles. Alternatively, it may generate other data structures, such as hierarchies of bounding boxes, that can then be used at the rendering/fragment processing stage to identify those primitives that need to be processed for a respective tile.

The binning/tiling process 13 may also cull primitives that are not visible (e.g. that fall outside the view frustum, and/or based on the facing direction of the primitives).

As part of the geometry processing 12 and/or the binning/tiling operation 13 the primitives to be processed will be "assembled". The primitives will, as discussed above, be assembled from a set of indices referencing vertices in a set of vertices for the render output processing being performed, based on primitive configuration information indicating how the vertex indices are to be assembled into primitives for processing when generating the render output.

Such primitive assembly may be performed as part of and at an appropriate stage of the geometry processing 12 and/or as part of the binning/tiling processing 13, as desired. There may also, if desired, be two (or more) "primitive assembly" operations. For example, an initial primitive assembly operation could be performed to identify those vertices that will actually be used for the render output being generated before performing any vertex shading of the vertices, but with there then being a later primitive assembly stage that provides a sequence of assembled primitives for the binning/tiling stage 13.

Once the binning/tiling process 13 has generated the necessary data structures for identifying the primitives to be processed for respective tiles of the render output, the primitives can then be and are then subjected to appropriate rendering/fragment processing 14. This operation is performed in the present embodiments on a tile-by-tile basis, using the data structures generated by the tiling/binning process 13 to identify those primitives that need to be processed for a respective tile.

The rendering/fragment processing 14 can comprise any suitable and desired rendering and fragment processing operations that may be performed. Thus it may comprise, for example, first rasterising primitives to be processed for a tile to fragments, and then processing those fragments accordingly (e.g., and in embodiments, by performing appropriate fragment shading of the fragments). The rendering/fragment processing 14 may also or instead comprise performing ray tracing operations, such as performing the rendering by tracing rays for respective fragments representing respective sets of one or more sampling positions of the output being generated. Hybrid ray tracing operations would also be possible, if desired.

The output of the rendering/fragment processing 14 (the rendered fragments) is written to a tile buffer (not shown). Once the processing for the tile in question has been completed, then the tile will be written to an output data array in memory 6, and the next tile processed, and so on, until the complete output data array 15 has been generated. The process will then move on to the next output data array (e.g. frame), and so on.

The output data array 15 may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

Figure 3:
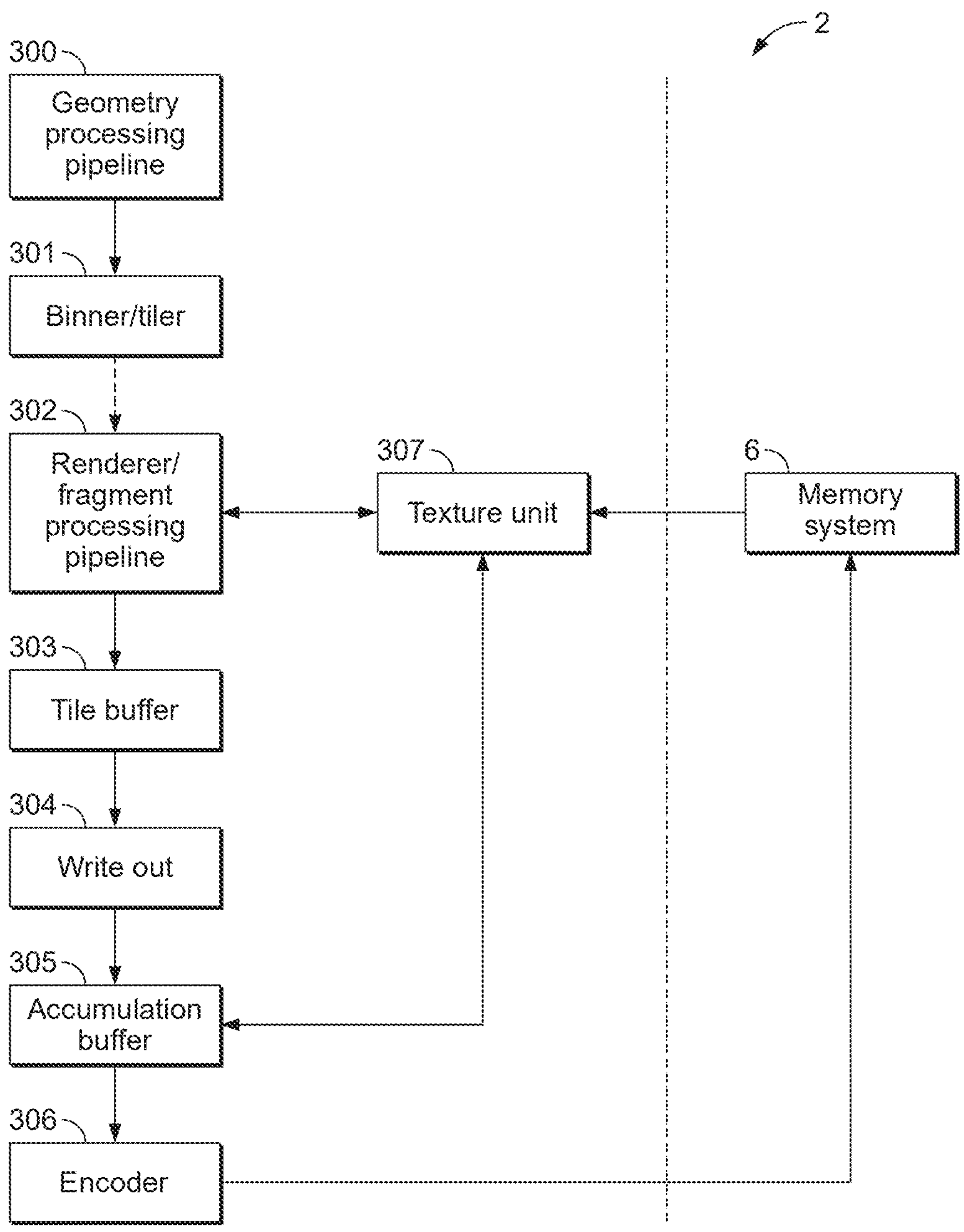
FIGS. 3 and 4 show schematically a graphics processor that may be operated in accordance with the technology described herein.
Figure 4:
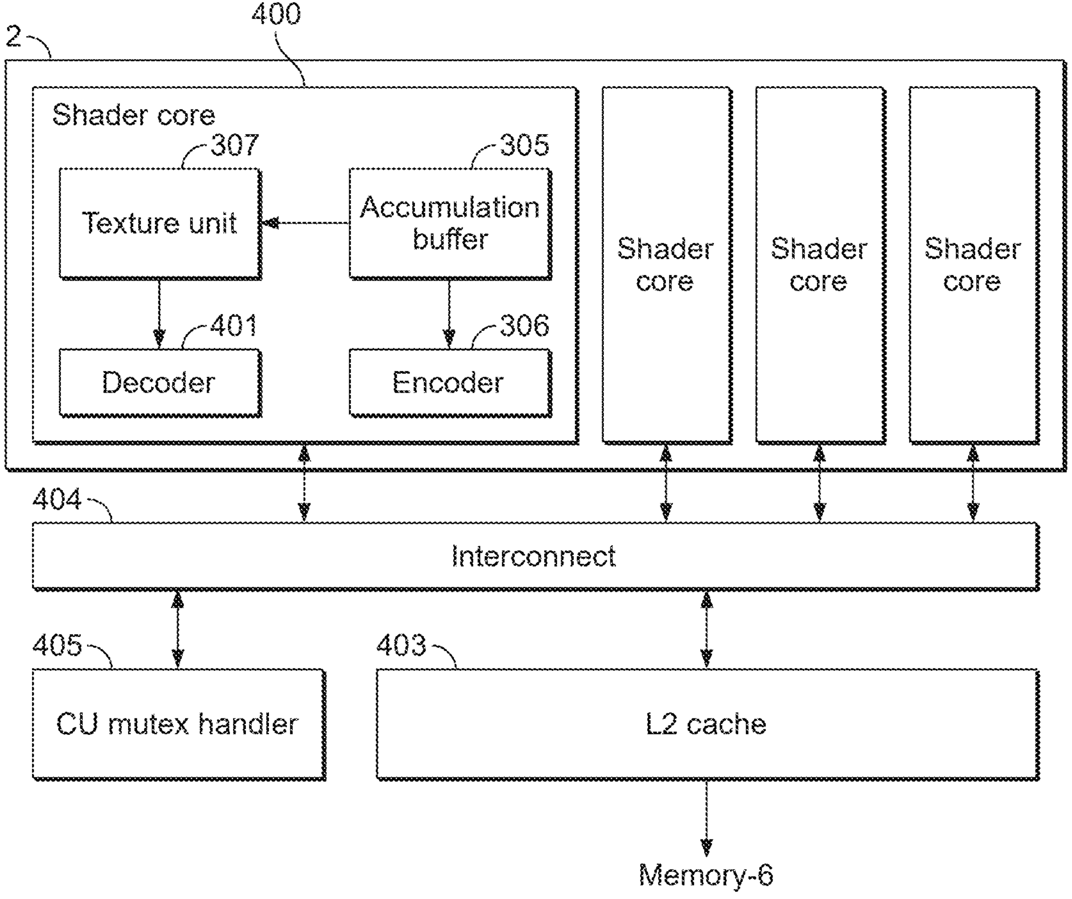

FIGS. 3 and 4 show in more detail an embodiment of a graphics processor (GPU) 2 that can execute a graphics processing pipeline of the form shown in FIG. 2, and that can be operated in the manner of the technology described herein.

FIGS. 3 and 4 shows the particular elements and units of the graphics processor in the present embodiments that are relevant to operation in the manner of the technology described herein. It will be appreciated that the graphics processor may, and typically will, comprise other elements and components that are not shown in FIGS. 3 and 4.

As shown in FIG. 3, the graphics processor 2 in the present embodiments comprises appropriate processing circuits operable to execute a geometry processing pipeline 300 to perform the geometry processing operations as discussed above with reference to step 12 of FIG. 2. In the present embodiments, this geometry processing pipeline is implemented and the geometry processing performed by executing appropriate geometry processing shader programs in a programmable processing (shader) core or cores of the graphics processor 2. Other arrangements, such as having a fixed function geometry processing pipeline would be possible, if desired.

There is then a binning/tiling circuit or circuits (binner/tiler) 301, that performs the binning process discussed above with reference to step 13 of FIG. 2.

The graphics processor 2 then comprises appropriate processing circuits to execute a rendering/fragment processing pipeline 302 (step 14 of FIG. 2). Again in the present embodiments, the fragment processing pipeline 302 is implemented by executing appropriate fragment processing shader programs on a shader core or cores of the graphics processor 2, but fixed function fragment processing could also be performed, if desired.

In the present embodiments, as the graphics processor 2 is a tile-based graphics processor, the fragment processing pipeline 302 operates on and to generate respective tiles of an output being generated, and so correspondingly writes the output for a tile or tiles that it is generating to a tile buffer 303 which stores the tile data locally while a tile is being processed.

Once the processing for a tile has been finished, it can then be written out from the tile buffer by a write-out circuit 304 towards the memory system 6.

As shown in FIG. 3, the tile data is written out from the tile buffer in the present embodiments via an accumulation buffer 305 and an encoder 306. The operation of the accumulation buffer 305 and encoder 306 in the present embodiments will be described in more detail below.

As also shown in FIG. 3, the fragment processing pipeline 302 has access to a texture unit (texture mapper) 307 which is operable to perform texturing operations on texture data stored in the memory system 6 and to provide the results of those texturing operations to the fragment processing pipeline 302 for use.

As shown in FIG. 3, the accumulation buffer 305 also has an interface to and can communicate with the texture unit (texture mapper) 307. This operation will again be discussed in more detail below.

FIG. 4 shows further elements of the graphics processor 2 in the present embodiments in more detail. In particular, FIG. 4 shows in more detail the configuration of the processing (shader) cores in the graphics processor 2 in the present embodiments.

As shown in FIG. 4, the graphics processor 2 comprises a plurality of shader cores 400, with each shader core having its own respective texture unit 307, accumulation buffer 305 and encoder 306.

As shown in FIG. 4, each shader core 400 in the present embodiments also includes a corresponding decoder 401 that is operable to decode data that is stored in a compressed form in the memory for provision to the texture unit 307. Although the encoder 306 and decoder 401 are shown as separate components in FIG. 4, it will be appreciated that they can be provided in the form of a combined encoder/decoder (codec) if desired.

It will also be appreciated that the shader cores 400 in the graphics processor 2 in the present embodiments can and will include other components not shown in FIG. 4, such as a programmable execution unit for executing program instructions to perform graphics processing operations, etc., that are necessary for the operation of a shader core to execute shader programs to perform processing operations.

FIG. 4 also shows that the shader cores and in particular the encoder 306 and texture unit 307 of each shader core are operable to and configured to communicate with the memory system 6 via an appropriate cache hierarchy, including in particular an L2 cache 403. (Other cache hierarchy arrangements would be possible, such as comprising multiple cache levels, if desired.)

An appropriate interconnect 404 is provided to allow the shader cores to communicate with the L2 cache 403 and thus the memory 6.

FIG. 4 also shows a mutex handler 405 that is in communication with the shader cores 400 of the graphics processor. The mutex handler 405 maintains a set of mutexes, including a respective mutex for each compression unit that a shader core of the graphics processor is currently generating data for. Each mutex can be assigned to the accumulation buffer of only one shader core at any one time. The mutex handler 405 keeps track of the identity of the accumulation buffer (if any) that a mutex is currently assigned to. The operation of the mutex handler 405 in the present embodiments will be discussed in more detail below.

The data decoder 401 is operable to decompress data received from the memory 6 for use by the texture unit 307 of the graphics processor 2.

The encoder 306 is operable to compress (tile) data from the accumulation buffer 305 prior to sending that data to the memory 6 (via the L2 cache 403).

Figure 5:
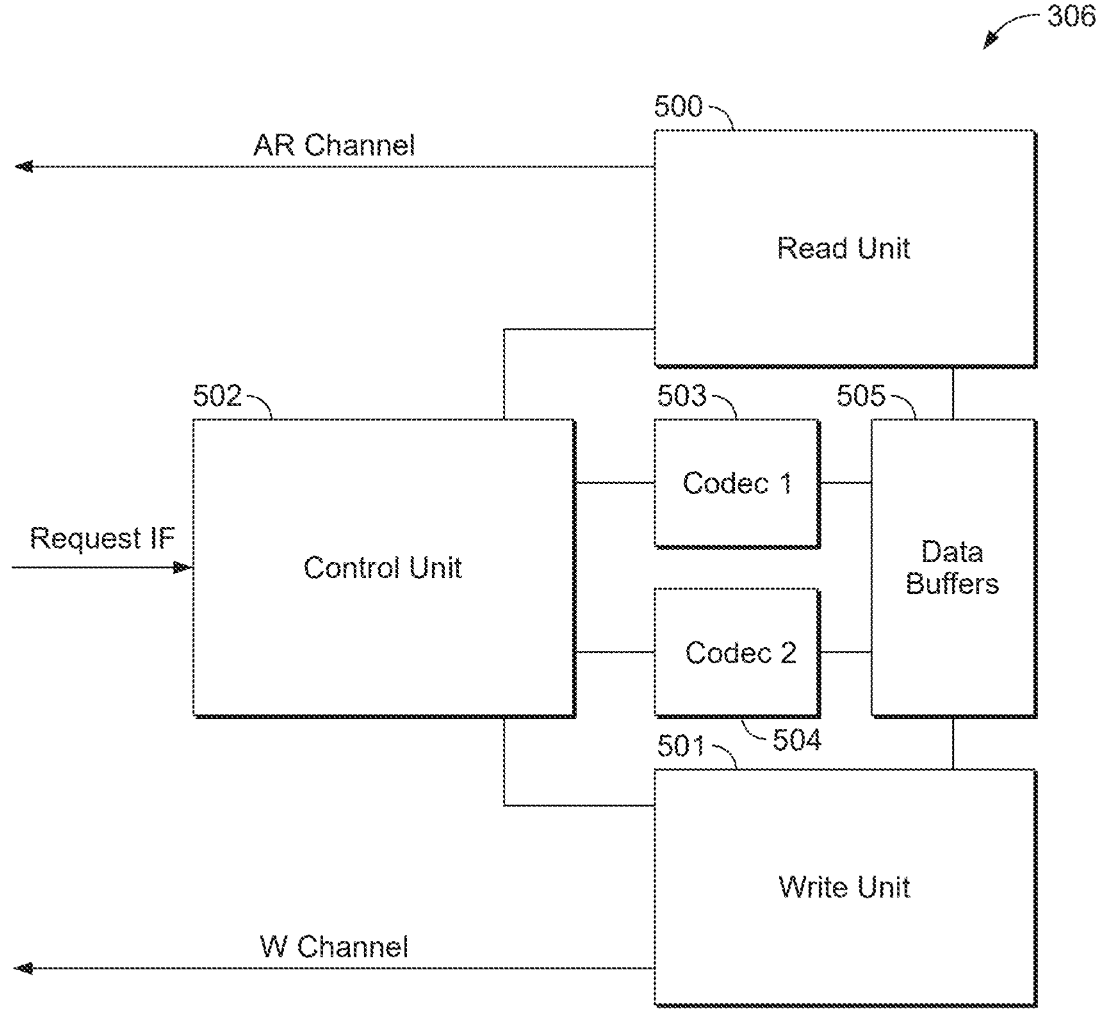
FIG. 5 shows an encoder of the graphics processor of FIGS. 3 and 4 in more detail.

FIG. 5 shows an embodiment of the data encoder 306 in the present embodiments. As shown in FIG. 5, the (and each) data encoder 306 includes respective read 500 and write 501 units (circuits) that are operable to, respectively, receive data from the accumulation buffer 305, and write data to the L2 cache 403 (and thus to the memory system 6).

The data encoder 17 also includes an appropriate control unit (circuit) 502 that receives requests for encoding and controls the data encoder 306 to respond to those requests accordingly and appropriately.

As shown in FIG. 5, the data encoder 306 also includes one or more codecs 503, 504, and a set of data buffers 505 for temporarily storing data in the data encoder 306 while that data is processed.

The data encoder 306 can include any desired number of codecs, e.g. that are each respectively operable to perform a different encoding (compression) scheme. For example, one codec may be configured to perform an appropriate variable rate compression scheme, with the other codec being configured to perform an alternative, e.g. fixed rate compression scheme.

Other arrangements would be possible.

In the present embodiments, the encoder 306 is configured to and operable to perform block-based encoding, i.e. in which input data arrays of a particular "block" (compression unit) size are encoded (compressed) as respective compression units.

Thus the encoder will take as an input compression units of a particular data size (comprising data arrays of a particular size (W×H)), and then compress each such compression unit to provide a compressed output corresponding to the compression unit in question. Any given render output will accordingly be divided into an array of compression units of the particular size, with each such compression unit then being compressed and output independently.

Figure 6:
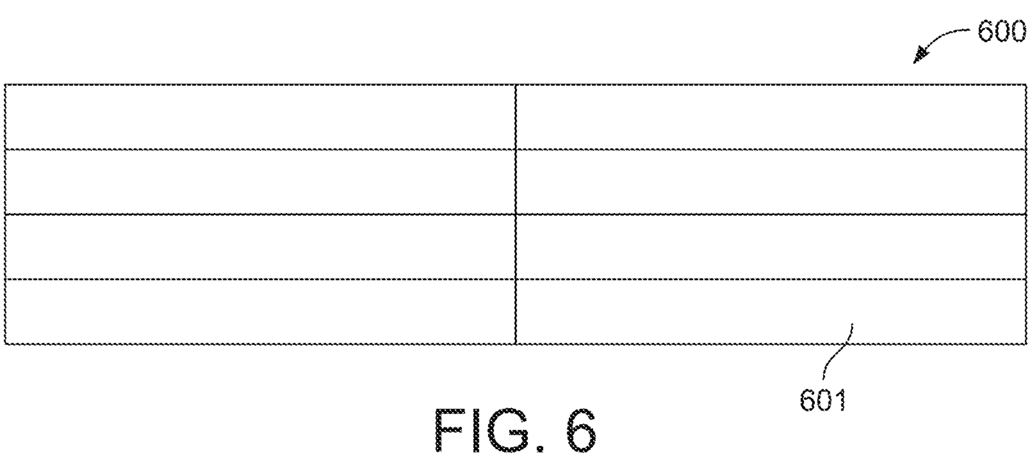
FIG. 6 shows an exemplary compression unit layout for an output data array to be compressed.

FIG. 6 illustrates this, and shows an exemplary output, such as a frame (image) 600 organised and stored in memory as a 2×4 array of 64×8 pixel (sampling position) compression units 601.

The compression unit size that the encoder 306 uses may be fixed, e.g. such that each different codec of the encoder 306 has its own, fixed compression unit size. Alternatively the encoder 306 may be operable to handle different sizes of input compression unit, for example with the particular size of compression unit to be used being set in use, for example on a (render) output-by-output basis.

As discussed above, in the present embodiments, the graphics processor 2 is a tile-based graphics processor, and thus operates to generate a given render output, such as a frame (an image), as respective tiles, which are typically square.

Figure 7:
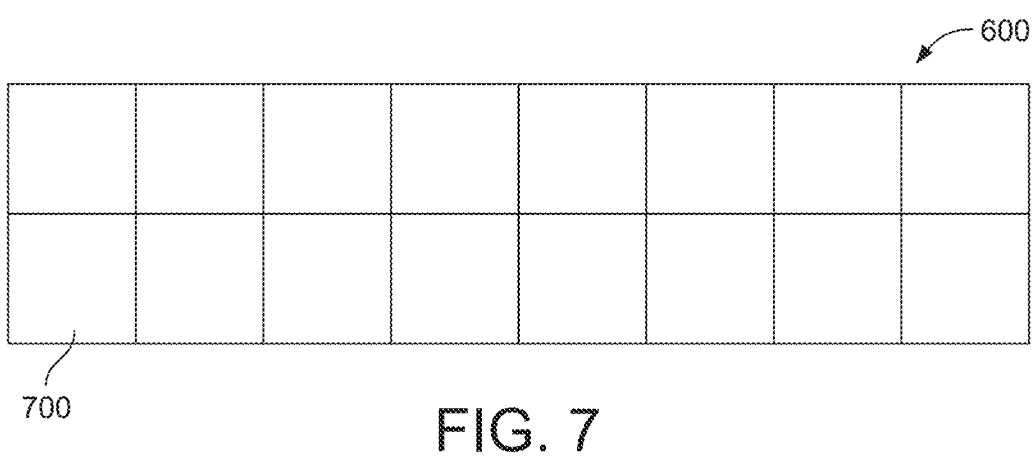
FIG. 7 shows the corresponding rendering tile layout for the output data array of FIG. 6.

FIG. 7 illustrates this, and shows the corresponding tiles 700 that are generated when generating the frame (image) 600 shown in FIG. 6. It can be seen that the image 600 is generated as an array of 8×2 tiles, with each tile being 16×16 pixels (sampling positions) in size (in this example).

Figure 8:
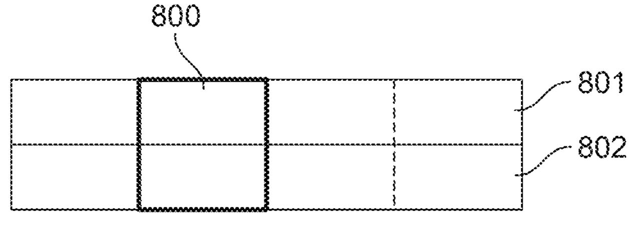
FIG. 8 illustrates the potential mismatch between a rendering tile and compression units to be encoded.

It will be appreciated from FIGS. 6 and 7 that a given 16×16 rendering tile produced by the graphics processor will potentially cover only part of one or more of the compression units 601 that the encoder encodes for the output 600. FIG. 8 illustrates this, and shows an exemplary tile 800 forming only part of two respective compression units 801, 802.

As shown in FIG. 8, the compression units 801, 802 will in fact comprise respective parts from four of the rendering tiles that will be generated when rendering the output frame (image) 600. Thus in such cases, it will not be possible for the encoder simply to compress a rendering tile as and when that rendering tile is completed, as the rendering tile will not match the (size of) the compression unit that the encoder compresses.

The present embodiments address this issue of the tile size (potentially) not matching the compression block (compression unit) size that the encoder 306 requires for its encoding process in a tile-based graphics processor.

In particular, in the present embodiments, and as shown in FIGS. 3 and 4, the graphics processor of the technology described herein includes an accumulation buffer 305 intermediate the tile write-out circuit 304 and the encoder 306, such that tiles will be written from the tile buffer 303 to the accumulation buffer 305, with the accumulation buffer then providing appropriate entire compression blocks (compression units) of tile data for compression to the encoder 306.

This then allows the encoder 306 simply to operate on and compress "complete" compression units, such that the encoder has no need, for example, to be able to perform partial compression of compression units, or to itself retrieve additional data for providing a "complete" compression unit for compression.

To facilitate this operation, the accumulation buffer 305 is configured to be able to store tile data from the tile buffer for plural compression units at the same time, so it can correspondingly accumulate tile data for plural compression units at the same time. The accumulation buffer 305 tracks the data that it is storing for all the compression units that it is currently storing, for example in the form of an appropriate compression unit tracking table.

FIGS. 9-12 show the operation of the write-out circuit 304, accumulation buffer 305 and encoder 306 of a given shader core in embodiments of the technology described herein.

In the present embodiments, and as shown in FIG. 4, each shader core 400 has its own respective accumulation buffer 305 and encoder 306. Thus each shader core operates independently of the other shader cores in terms of the compression unit accumulation and encoding process.

Each shader core of the graphics processor (that has an accumulation buffer and encoder in the manner of the present embodiments) thus operates in the manner shown in FIGS. 9-12.

Figure 9:
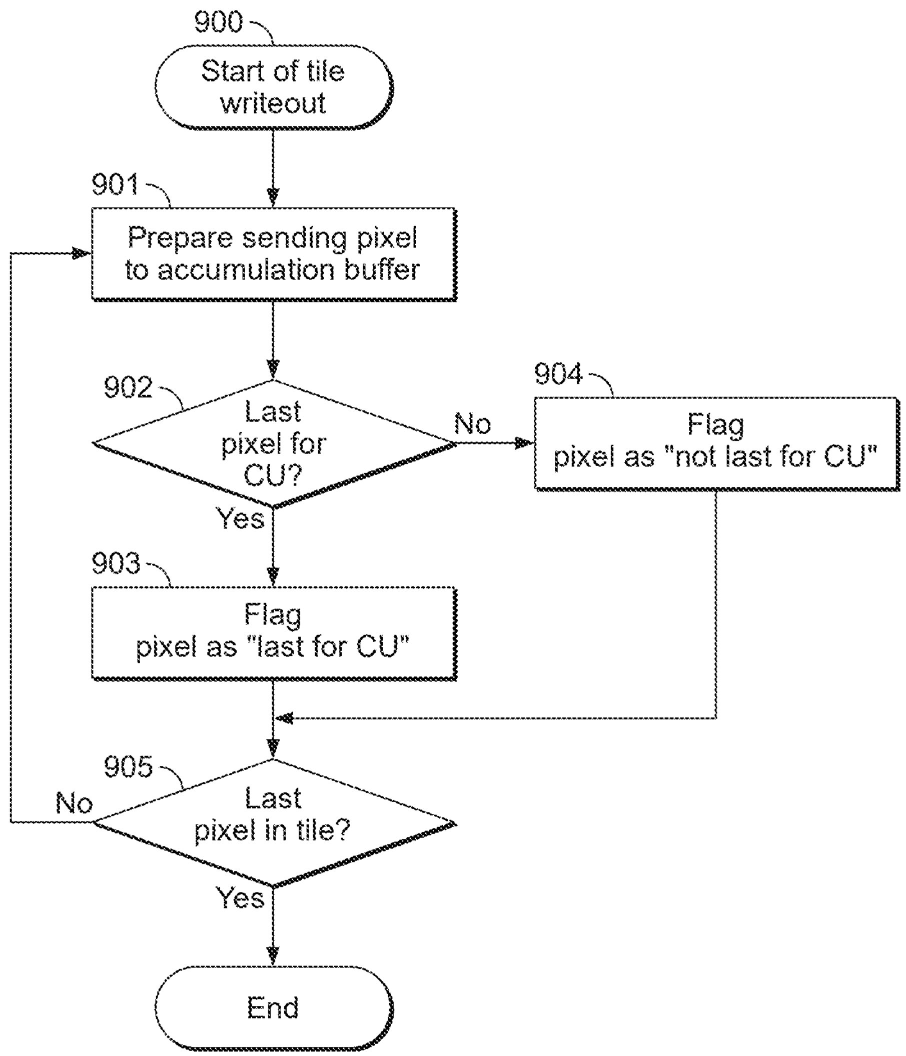
FIG. 9 shows the writing of a tile to the accumulation buffer in an embodiment.

FIG. 9 shows the operation of the write-out unit (circuit) 304 when writing a finished tile out from the tile buffer 303.

When a tile is ready to be written from the tile buffer to the accumulation buffer 305 by the writeback unit 304 (step 900), the writeback unit indicates to the accumulation buffer which compression unit(s) the pixels (sampling positions) of the tile relate to. The accumulation buffer determines whether it is already accumulating data for the indicated compression unit(s), and if so, then the write of the sampling positions (pixels) from the tile buffer to the accumulation buffer is allowed to proceed (step 901).

When the tile data relates to a new compression unit, appropriate accumulation buffer storage for that new compression unit is allocated, together with an entry in the compression unit tracking table, before the data is then written to the accumulation buffer (step 901). The storage allocated for the compression unit is based on how much data will be necessary for the compression unit, e.g. based on the pixel (sampling position) format for the output being generated and the appropriate compression parameters (e.g. block size).

When storage for the compression unit(s) that the tile relates to is or has been allocated, the write-out circuit will write respective pixels (sampling positions) for the tile being written out to the allocated storage of the accumulation buffer 305.

The write out unit 304 determines whether a given pixel being written out is the last pixel for a given compression unit that will be written out from the shader core in question (step 902). The write-out unit then correspondingly marks (flags) the pixel being written out as either being the last pixel for the compression unit in question that will be produced by the shader core (step 903) or not (step 904).

The write-out unit tracks and indicates when a pixel being written out for a tile is the last pixel for a given compression unit that will be generated by the shader core in question (as a given shader core of the graphics processor may only process some but not all of the tiles of the overall render output being generated (with other tiles being processed by other shader cores), such that a given individual shader core may not itself generate all the pixels required for a given compression unit of the overall render output being generated.)

Accordingly, the write-out unit 304 keeps track of when the shader core in question has generated the last pixel that it itself is going to generate for a compression unit for the render output in question, and when it writes out a pixel (sampling position) to the accumulation buffer, indicates that to the accumulation buffer 305 accordingly. The write-out circuit 304 also indicates which compression unit for the output being generated (that the tile being written out belongs to) that each pixel for the tile that is being written out relates to.

This process is repeated until all the pixels for the tile in question have been written out from the tile buffer 303 to the accumulation buffer 305 (step 905).

The next tile (once ready) can then be written out from the tile buffer 303 to the accumulation buffer 305, and so on.

Figure 10:
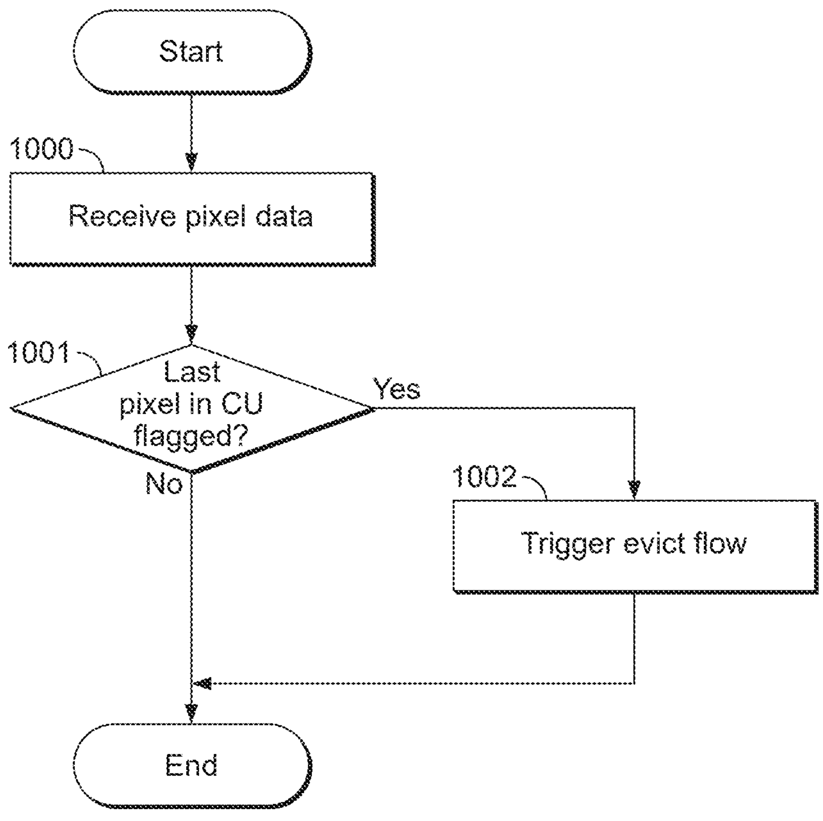
FIG. 10 shows the operation of the accumulation buffer when receiving tile data in an embodiment.

FIG. 10 shows the corresponding operation of the accumulation buffer 305 when receiving pixel data for a tile from the write-out unit 304. As shown in FIG. 10 the accumulation buffer 305 will receive pixel data written by the write-out unit 304 from the tile buffer 303, and add (store) that data to (for) the appropriate stored compression unit that it is accumulating (buffering). The tracking of the data stored for the compression unit will correspondingly be updated (step 1000).

As shown in FIG. 10, the accumulation buffer 305 also checks whether a pixel it receives has been flagged as being the last pixel in a compression unit (for the shader core in question, as discussed above) (step 1001).

When the last pixel for a given compression unit to be generated by a given shader core for a given render output is received by the accumulation buffer, then an appropriate eviction process to output the corresponding encoded compression unit is triggered (step 1002).

Otherwise, the process simply repeats as more pixel data is received.

Figure 11:
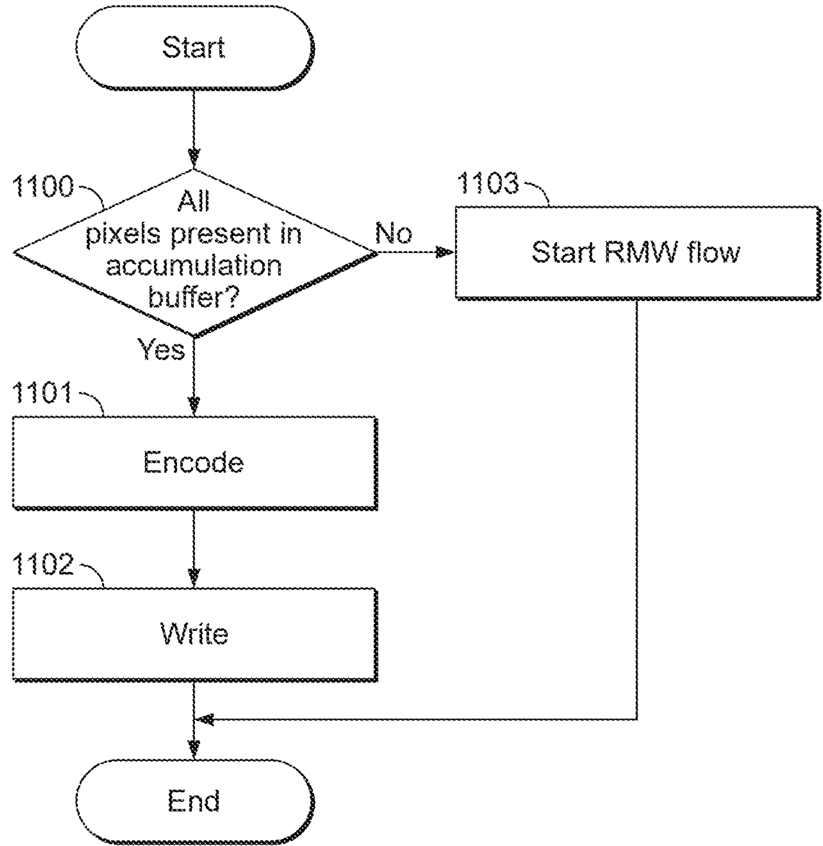
FIG. 11 shows the operation when a compression unit is evicted from the accumulation buffer in an embodiment.

FIG. 11 shows the compression unit "eviction process" that is triggered in step 1002 in FIG. 10 when the last pixel for a compression unit that will be generated by the shader core in question is received by the accumulation buffer 305.

As shown in FIG. 11, the eviction process first determines whether all the pixels for the compression unit in question are present in the accumulation buffer (step 1100). This is determined from the compression unit tracking performed by the accumulation buffer.

If so, then the pixels for the compression unit are sent from the accumulation buffer 305 to the encoder 306, which operates to encode (compress) the compression unit (step 1101) and then write the compressed block of data to the memory system (step 1102).

On the other hand, and as shown in FIG. 11, when it is determined that not all pixels for the compression unit are present in the accumulation buffer (for the shader core in question), a "read-modify-write" flow is performed (step 1103) to enable the encoder 306 to still be provided with a "complete" compression unit for compressing.

In particular, as part of the read-modify-write flow, the accumulation buffer retrieves any "missing" data that it doesn't already store for the compression unit that is to be evicted from the memory system 6, to then be able to provide a complete compression unit to the encoder 306 for processing.

To do this, in the present embodiments, as shown in FIGS. 3 and 4, the accumulation buffer 305 sends an appropriate request to the texture mapper (texture unit) 307, which then operates to retrieve the requested "missing" data from the memory and return it to the accumulation buffer.

Once the accumulation buffer 305 has all the data for the complete compression unit, then it outputs the complete compression unit to the encoder 306 (as discussed above), and the encoder 306 then encodes (compresses) the compression unit and writes it to the memory system accordingly.

Figure 12:
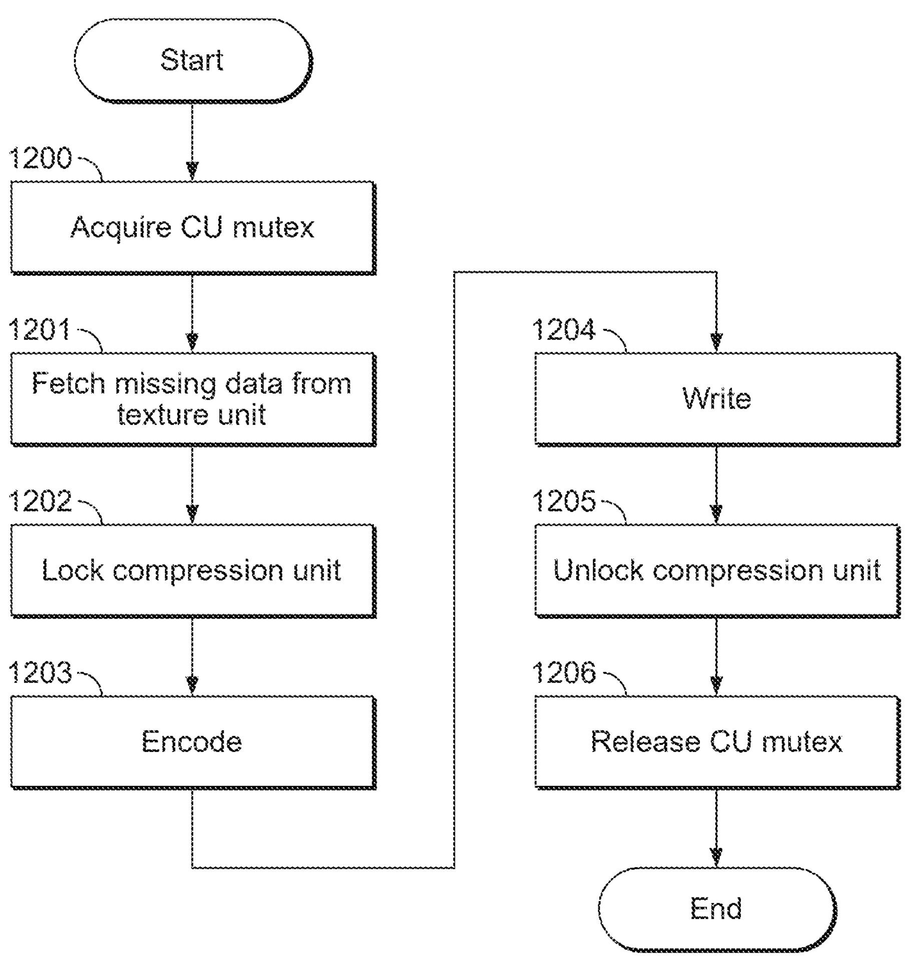
FIG. 12 shows the operation when the accumulation buffer needs more data for a compression unit to be written out in an embodiment.

FIG. 12 shows the read-modify-write flow of step 1103 in FIG. 11 in more detail.

As shown in FIG. 12, at the start of this read-modify-write flow, the accumulation buffer 305 first acquires a (global) mutex for the compression unit in question (step 1200) (from the CU mutex handler 405). This is to ensure that only one accumulation buffer at any one time is performing a read-modify-write operation on a given compression unit for a render output. (As, discussed above, different shader cores of the graphics processor may be generating tiles for different parts of the same compression unit. It is therefore desirable to ensure that only one accumulation buffer has access to a compression unit for performing a read-modify-write operation at any one time.)

Once the compression unit mutex has been acquired, the accumulation buffer then signals the texture unit (texture mapper) 307 to fetch the data that it does not have for the compression unit in question (the "missing" compression unit data) from the memory system (step 1201).

The compression unit in question is then "locked", so as to prevent all other texture mappers in the graphics processor from reading the data of the compression unit that is being encoded. This can be done in any appropriate and desired manner, and is in embodiments achieved by invalidating any and all data related to the compression unit in question in all texture mappers in the GPU (such that they will not use any cached data for the compression unit in question).

In the present embodiments, this is done via the cache coherency protocol of the cache hierarchy for the graphics processor and graphics processing system in question. In embodiments the accumulation buffer sends an appropriate "invalidation" request via the coherency protocol for this purpose.

In an embodiment, where compression units are stored as respective, separate, linked headers and payloads, then a compression unit is "locked" in this way by locking the header (the cache line storing the header) for the compression unit in question, such that that correspondingly causes invalidation of data related to the compression unit in all texture mappers in the graphics processor.

Once the texture unit has acquired the missing data from the memory system and provided it to the accumulation buffer 305, the accumulation buffer then provides the complete compression unit to the encoder 306 which then encodes the compression unit (step 1203) and writes the compression unit to the memory system (step 1204).

Once the compression unit has been written to the memory system, then the compression unit can be "unlocked", so that texture mappers are able to read the compression unit (from the memory system) (step 1205). Again, this is in embodiments achieved in the appropriate manner for the coherency protocol used in the graphics processor and graphics processing system in question, for example by writing an appropriate (valid) header to the memory system for the compression unit once the payload data for the compression unit has been written to the memory system.

The compression unit mutex is then released (step 1206).

Another accumulation buffer (shader core) can then perform a read-modify-write process for the compression unit, if required.

FIGS. 9-12 show the operation of the present embodiments in particular where data for compression units is accumulated in the accumulation buffer before being encoded and written to memory. This operation would be appropriate in the case where any given rendering tile does not provide a complete compression unit for encoding (i.e. where data from more than one rendering tile will be required for a compression unit).

The Applicants have further recognised that there could be situations where data from a single rendering tile provides a complete compression unit for encoding. This could be the case, for example, where the rendering tiles are equal to or larger than the compression units that the block-based encoding uses.

In this case, while it would still be possible simply to accumulate compression unit data in storage of the accumulation buffer and then output the compression units, e.g. "immediately", in an embodiment, rather than storing the tile data in the accumulation buffer and then providing it from the accumulation buffer storage to the encoder, the tile data is instead streamed directly to the encoder as it is written out from the tile buffer. This may be via a communications path that bypasses the accumulation buffer entirely, or there may, for example, be a communication path that allows tile data to pass through the accumulation buffer without being (temporarily) stored in the storage of the accumulation buffer. In this case, the accumulation buffer will not accumulate any data for the tile, but rather the tile data will be passed directly to the encoder without being accumulated by the accumulation buffer.

Thus, in embodiments of the technology described herein, an accumulation buffer is used to accumulate data from tiles being generated by the graphics processor to provide complete compression units (compression blocks) to the block-based encoding process.

In the eviction process of FIG. 11, when all pixels for a compression unit are present in the accumulation buffer 305 of shader core 400, the pixels for the compression unit are sent from the accumulation buffer 305 to the encoder 306, which encodes (compresses) the compression unit and writes the compressed block of data to the memory system. Otherwise, if not all pixels for a compression unit are present in the accumulation buffer 305 of shader core 400, the read-modify-write flow of FIG. 12 is performed to retrieve any missing data from memory and provide the encoder 306 with all pixels for the compression unit.

As illustrated in FIG. 10, this eviction process is triggered and performed in response to the accumulation buffer 305 of shader core 400 receiving the last pixel for a given compression unit to be generated by the shader core 400 for a given render output. In embodiments, the same eviction process is also triggered and performed in the case where existing compression unit data needs to be evicted from the accumulation buffer 305 so as to free up storage for a new compression unit (where there is not enough spare storage capacity in the accumulation buffer storage for that new compression unit).

The Applicants have recognised that the read-modify-write flow of FIG. 12 may be relatively resource intensive, and it may therefore be desirable to reduce the likelihood and frequency of triggering that flow. This may be done by increasing the likelihood that all pixels for a compression unit will be available in accumulation buffer 305 when the eviction process is triggered, and/or by reducing the likelihood of the accumulation buffer 305 running out of storage capacity and thus needing to trigger the read-modify-write flow to free up storage space.

FIG. 13 illustrates one way of reducing the likelihood and frequency of triggering the read-modify-write flow of FIG. 12, in accordance with an embodiment.

Figure 13A:
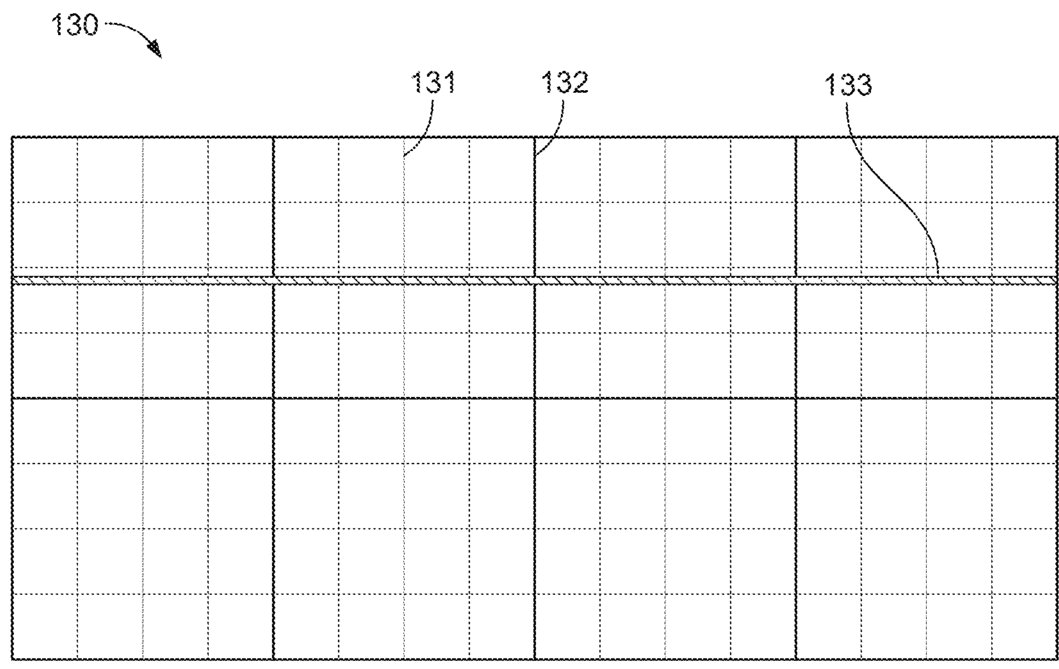
FIG. 13A illustrates an exemplary tile-based rendering configuration.

FIG. 13A shows an example frame (image) 130 that is generated as an array of 16×8 tiles 131, with each tile 131 being 16×16 pixels (sampling positions) in size. In this example, frame 130 is stored in memory using relatively "wide" compression units 133 that are each 256×2 pixels (sampling positions) in size (FIG. 13 illustrates only one of these compression units 133 for clarity). Frame 130 is thus organised and stored in memory as a 1×64 array of 256×2 pixel (sampling position) compression units 133.

To facilitate frame 130 being generated in parallel by different shader cores 400, the frame 130 is divided into groups of tiles ("metatiles") 132, with each group of tiles ("metatile") 132 being assigned to and generated by a respective shader core 400. In the example of FIG. 13A, each metatile 132 corresponds to a group of 4×4 contiguous tiles and covers a 64×64 pixel (sampling positions) region of the frame 130.

In this example, each metatile 132 is assigned to and generated by a different shader core 400, such that the data for any given compression unit 133 will be generated by four different shader cores. This means that not all pixels for a compression unit 133 will be accumulated in the accumulation buffer 305 of the same shader core 400. This means that the read-modify-write flow will be triggered for an accumulation buffer of a shader core to retrieve data generated by other shader cores.

Figure 13B:
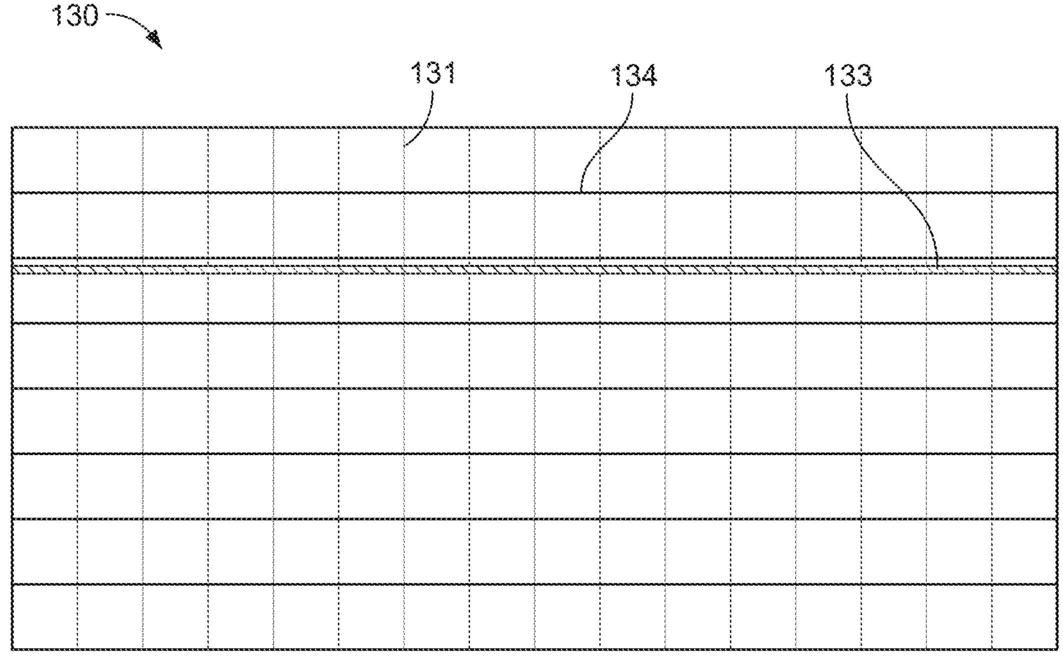
FIG. 13B illustrates a tile-based rendering configuration in accordance with an embodiment.

FIG. 13B shows an improved arrangement in accordance with an embodiment. FIG. 13B shows the same frame 130 as FIG. 13A, and is thus generated as an array of 16×8 tiles 131, with each tile 131 being 16×16 pixels (sampling positions) in size. Frame 130 is again stored in memory using relatively "wide" compression units 133 that are each 256×2 pixels (sampling positions) in size. Frame 130 is thus organised and stored in memory as a 1×64 array of 256×2 pixel (sampling position) compression units 133.

To facilitate frame 130 being generated in parallel by different shader cores 400, the frame 130 is again divided into groups of tiles ("metatiles") 134, with each group of tiles ("metatile") 134 being assigned to and generated by a respective shader core 400.

In the embodiment of FIG. 13B, in contrast to the arrangement of FIG. 13A, the size and shape of the metatiles 134 is configurable, and is selected based on the size and shape of the compression units 133. In particular, as shown in FIG. 13B, in this embodiment, each metatile 134 corresponds to a group of 16×1 contiguous tiles and covers a relatively "wide" 256×16 pixel (sampling positions) region of the frame 130.

Each such "wide" metatile 134 is assigned to and generated by a different shader core 400, such that the data for any given compression unit 133 will be generated by the same shader core 400. This means that all pixels for a compression unit 133 will be accumulated in the accumulation buffer 305 of the same shader core 400. This means that the read-modify-write flow will not need to be triggered for an accumulation buffer of a shader to retrieve data generated by a different shader core.

FIG. 14 illustrates another way of reducing the likelihood and frequency of triggering the read-modify-write flow of FIG. 12, in accordance with an embodiment.

Figure 14A:
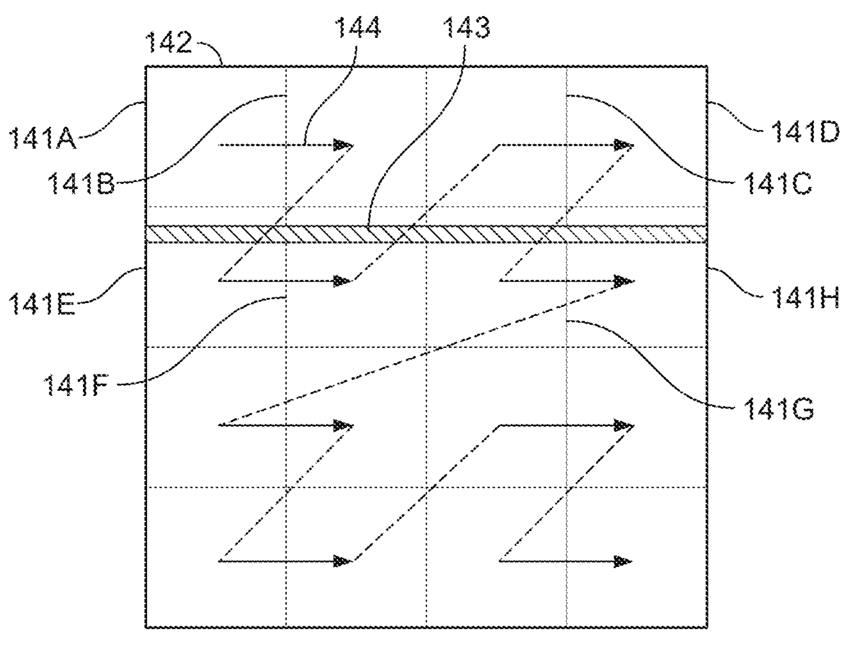
FIG. 14A illustrates an exemplary tile-based rendering configuration.

FIG. 14A shows an example 64×64 pixel (sampling positions) metatile 142 of a frame (image) that corresponds to a group of 4×4 contiguous tiles 141, with each tile 141 being 16×16 pixels (sampling positions) in size. In this example, the frame is again stored in memory using relatively "wide" compression units 143, that in this example are each 64×2 pixels (sampling positions) in size (FIG. 14 illustrates only one of these compression units 143 for clarity). All of the 4×4 tiles 141 of metatile 142 are assigned to the same shader core 400 for processing.

FIG. 14A illustrates one way in which the shader core 400 may process and generate the 4×4 tiles 141 of the metatile 142 assigned to it. As illustrated in FIG. 14A, the shader core 400 may process the 4×4 tiles 141 of the metatile 142 in "Z-order" (Morton order) 144. Thus, shader core 400 may generate tile 141A, then tile 141B, then tile 141E, then tile 141F, then tile 141C, then tile 141D, then tile 141G, then tile 141H, etc.

In this example, the first pixels for compression unit 143 will be accumulated by the accumulation buffer 305 of shader core 400 when the shader core 400 generates tile 141E, and then further pixels for compression unit 143 will be accumulated by the accumulation buffer 305 when the shader core 400 generates tile 141F. Shader core 400 will then generate tiles 141C and 141D, and accumulation buffer 305 will accordingly need to accumulate pixel data for compression units corresponding to those tiles. Depending on the storage capacity of accumulation buffer 305, this may trigger eviction of pixel data for compression unit 143 accumulated when generating tiles 141E and 141F. Then, this evicted pixel data may need to be retrieved from memory by accumulation buffer 305 when tiles 141G and 141H are generated in order to obtain all pixels for compression unit 143.

Figure 14B:
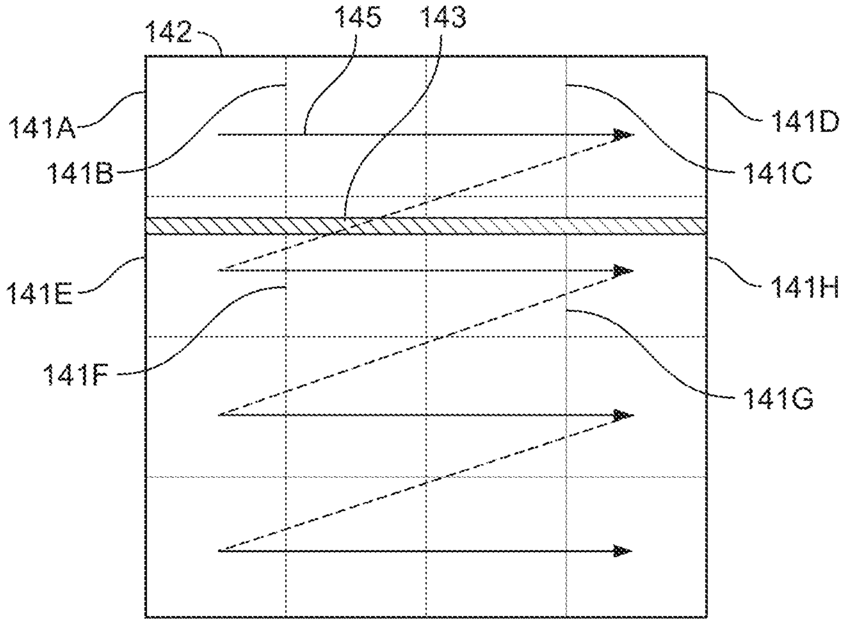
FIG. 14B illustrates a tile-based rendering configuration in accordance with an embodiment.

FIG. 14B shows an improved arrangement in accordance with an embodiment. FIG. 14B shows the same metatile 142 and compression unit 143 as FIG. 14A. In the embodiment of FIG. 14B, in contrast to the arrangement of FIG. 14A, the order in which the shader core 400 processes the 4×4 tiles 141 of the metatile 142 is configurable, and is selected based on the size and shape of the compression units 143. In particular, as shown in FIG. 14B, in this embodiment, the shader core 400 processes the 4×4 tiles 141 of the metatile 142 in "line-by-line" (raster) order 145. Thus, shader core 400 generates tile 141A, then tile 141B, then tile 141C, then tile 141D, then tile 141E, then tile 141F, then tile 141G, then tile 141H, etc.

In this embodiment, the first pixels for compression unit 143 will again be accumulated by the accumulation buffer 305 of shader core 400 when the shader core 400 generates tile 141E, and then further pixels for compression unit 143 will be accumulated by the accumulation buffer 305 when the shader core 400 generates tile 141F. The remaining pixels for compression unit 143 can then be accumulated by the accumulation buffer 305 when the shader core 400 generates tiles 141G and 141H, and, in contrast with the arrangement of FIG. 14A, there will be no risk of the generation of tiles 141C and 141D triggering eviction of pixel data for compression unit 143.

Thus, selecting the tile processing order based on the compression unit size and shape (e.g. selecting "line-by-line" (raster) order 145 in the case of relatively "wide" compression units 143) can reduce the likelihood of the accumulation buffer 305 becoming full, and thus triggering the read-modify-write flow.

In embodiments, tiles are issued to the graphics processor in the desired processing order (that is based on the compression unit size and shape), and the write out unit (circuit) 304 is forced to write out tiles from the tile buffer 303 in the issue order, e.g. regardless of the order in which the generation of the tiles is actually completed. This can reduce the likelihood of the accumulation buffer 305 becoming full, and thus triggering the read-modify-write flow.

Figure 15:
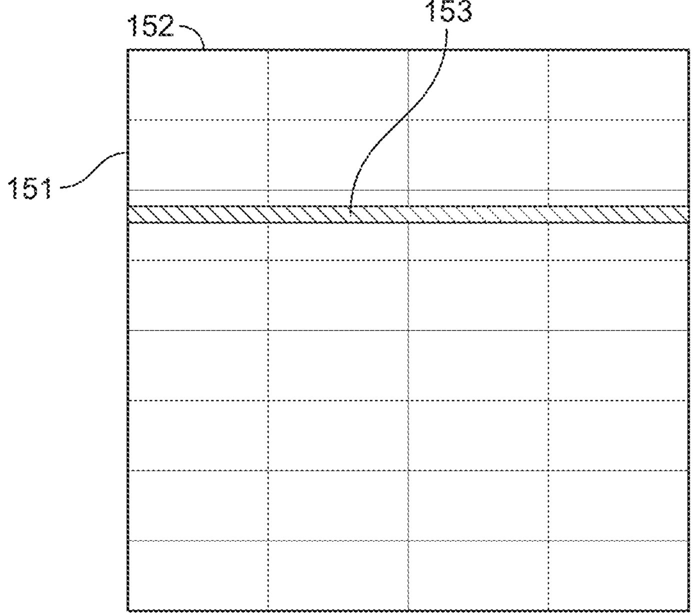
FIG. 15 illustrates a tile-based rendering configuration in accordance with an embodiment.

FIG. 15 illustrates a further improved arrangement in accordance with an embodiment. FIG. 15 again shows an example 64×64 pixel (sampling positions) metatile 152 of a frame (image). In this embodiment, the frame is again stored in memory using relatively "wide" compression units 153, that in this embodiment are each 64×2 pixels (sampling positions) in size (FIG. 15 illustrates only one of these compression units 153 for clarity).

In this embodiment, the effective tile size is configurable, and is selected based on the size and shape of the compression units 153. In particular, as shown in FIG. 15, in this embodiment, each tile 151 has a smaller, 16×8 pixels (sampling positions) size, and the metatile 152 corresponds to a group of 4×8 contiguous tiles 151.

This can reduce the number of compression units that the accumulation buffer needs to be able to accumulate at the same time (without triggering eviction). For example, assuming a "line-by-line" (raster) order processing order, the embodiment of FIG. 15 will only require that 4 compression units are accumulated at the same time, whereas the embodiment of FIG. 14B will require that 8 compression units are accumulated at the same time. This may be advantageous even though the smaller tile size increases the overall number of tiles that need to be generated.

Thus, reducing the effective tile size based on the compression unit size can reduce the number of compression units for which pixel data needs to be accumulated at the same time. This can reduce the likelihood of the accumulation buffer 305 becoming full, and thus triggering the read-modify-write flow.

Figure 16:
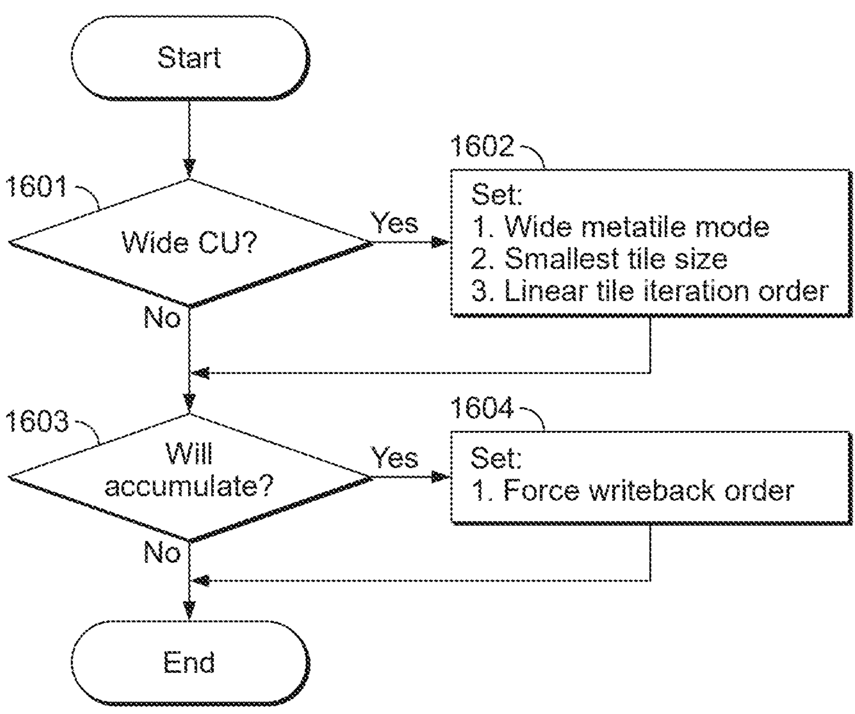
FIG. 16 illustrates a process for selecting a tile-based rendering configuration in accordance with an embodiment.

FIG. 16 shows a process for selecting a tile-based rendering configuration, in accordance with embodiments of the technology described herein. The process of FIG. 16 may be performed by the driver 10 for the graphics processor, or by the graphics processor 2.

As shown in FIG. 16, when a frame is to be generated, it may be determined whether a particularly wide compression unit is to be used to store the output frame in memory (e.g.

wider than a threshold number of pixels) (at step 1601). If it is determined that a wide compression unit size is to be used, then at least one of the metatile size and shape, tile size and shape, and tile processing order may be selected based on the compression unit size and shape (at step 1602), e.g. as described above.

It may then be determined whether the selected configuration will result in all pixel data for a compression unit being generated by the same shader core (at step 1603), and if this is the case, the write out unit (circuit) 304 may be forced to write out tiles from the tile buffer 303 in the order in which the tiles are issued for processing (at step 1604).

The frame may then be generated in accordance with the selected configuration, and encoded.

It can be seen from the above, that the technology described herein, in its embodiments at least, facilitates improved block-based encoding arrangements in tile-based graphics processing. This is achieved, in the embodiments of the technology described herein at least, by selecting a tile-based rendering configuration for generating a frame based on a compression unit size/shape that is to be used to store the frame in memory.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a tile-based graphics processing system; the method comprising:

selecting a rendering configuration for generating one or more rendering tiles of a render output based on a compression unit size and/or shape that is to be used to encode the one or more rendering tiles of the render output;

generating the one or more rendering tiles of the render output using the selected rendering configuration; and encoding the one or more rendering tiles of the render output using the compression unit size and/or shape;

wherein the graphics processing system comprises an encoder and an accumulation buffer operable to provide render output data to the encoder for encoding; and wherein selecting a rendering configuration for generating the one or more rendering tiles comprises: selecting a rendering configuration that will, or is likely to, cause the accumulation buffer to provide render output data for a complete compression unit to the encoder without requiring a request for render output data from a memory system.

2. The method of claim 1, wherein encoding the one or more rendering tiles comprises:

the accumulation buffer accumulating render output data for one or more compression units, and providing a complete compression unit to the encoder for encoding; and the encoder encoding the complete compression unit;

wherein the accumulation buffer providing a complete compression unit to the encoder for encoding comprises:

determining whether the accumulation buffer has not accumulated all of the render output data for the compression unit; and when it is determined that the accumulation buffer has not accumulated all of the render output data for the compression unit:

requesting the render output data for the compression unit that the accumulation buffer has not accumulated from a memory system; and combining render output data returned from the memory system with render output data for the compression unit that the accumulation buffer has accumulated so as to provide a complete version of the compression unit for encoding.

3. The method of claim 1, wherein selecting a rendering configuration for generating the one or more rendering tiles comprises selecting a size and/or shape of the one or more rendering tiles based on the compression unit size and/or shape.

4. The method of claim 3, comprising selecting a size and/or shape of the one or more rendering tiles that will reduce a number of compression units overlapping a rendering tile.

5. The method of claim 1, wherein selecting a rendering configuration for generating the one or more rendering tiles comprises selecting a processing order for processing the one or more rendering tiles based on the compression unit size and/or shape.

6. The method of claim 5, comprising selecting a processing order for processing the one or more rendering tiles that will result in rendering tiles that overlap a compression unit being processed successively.

7. The method of claim 1, wherein generating the one or more rendering tiles comprises:

issuing the one or more rendering tiles for processing in a processing order; and obliging processing of the one or more rendering tiles to finish in the processing order.

8. The method of claim 1, wherein the graphics processing system comprises one or more processing cores, and wherein generating the one or more rendering tiles of the render output comprises assigning one or more rendering regions of the render output to a respective processing core for processing; and wherein selecting a rendering configuration for generating the one or more rendering tiles comprises selecting a size and/or shape of the one or more rendering regions based on the compression unit size and/or shape.

9. The method of claim 8, comprising selecting a size and/or shape of the one or more rendering regions such that a rendering region encompasses one or more complete compression units.

10. A non-transitory computer readable storage medium storing software code which when executing on a processor performs the method of claim 1.

11. A tile-based graphics processing system comprising:

a configuration circuit configured to select a rendering configuration for generating one or more rendering tiles of a render output based on a compression unit size and/or shape that is to be used to encode the one or more rendering tiles of the render output;

a rendering circuit configured to generate one or more rendering tiles of a render output using a rendering configuration selected by the configuration circuit;

an encoder configured to encode one or more rendering tiles of a render output generated by the rendering circuit using a compression unit size and/or shape that a rendering configuration used by the rendering circuit to generate the one or more rendering tiles of the render output was selected based on; and
an accumulation buffer operable to provide render output data to the encoder for encoding;
wherein the configuration circuit is configured to select a rendering configuration for generating one or more rendering tiles by selecting a rendering configuration that will, or is likely to, cause the accumulation buffer to provide render output data for a complete compression unit to the encoder without requiring a request for render output data from a memory system.

12. The system of claim 11, wherein the accumulation buffer is configured to accumulate render output data generated by the rendering circuit for one or more compression units, and provide a complete compression unit to the encoder for encoding;
wherein the accumulation buffer is configured to provide a complete compression unit to the encoder for encoding by:
determining whether the accumulation buffer has not accumulated all of the render output data for the compression unit; and
when it is determined that the accumulation buffer has not accumulated all of the render output data for the compression unit:
requesting the render output data for the compression unit that the accumulation buffer has not accumulated from a memory system; and
combining render output data returned from the memory system with render output data for the compression unit that the accumulation buffer has accumulated so as to provide a complete version of the compression unit for encoding.

13. The system of claim 11, wherein the configuration circuit is configured to select a rendering configuration for generating one or more rendering tiles by selecting a size and/or shape of the one or more rendering tiles based on the compression unit size and/or shape.

14. The system of claim 13, wherein the configuration circuit is configured to select a size and/or shape of the one or more rendering tiles that will reduce a number of compression units overlapping a rendering tile.

15. The system of claim 11, wherein the configuration circuit is configured to select a rendering configuration for generating one or more rendering tiles by selecting a processing order for processing the one or more rendering tiles based on the compression unit size and/or shape.

16. The system of claim 15, wherein the configuration circuit is configured to select a processing order for processing the one or more rendering tiles that will result in rendering tiles that overlap a compression unit being processed successively.

17. The system of claim 11, wherein the rendering circuit comprises one or more processing cores, and an assigning circuit configured to assign one or more rendering regions of a render output to a respective processing core for processing; and
wherein the configuration circuit is configured to select a rendering configuration for generating one or more rendering tiles by selecting a size and/or shape of the one or more rendering regions based on the compression unit size and/or shape.

18. The system of claim 17, wherein the configuration circuit is configured to select a size and/or shape of the one or more rendering regions such that a rendering region encompasses one or more complete compression units.

19. A tile-based graphics processor comprising:
a rendering circuit configured to generate one or more rendering tiles of a render output using a rendering configuration selected based on a compression unit size and/or shape that is to be used to encode the one or more rendering tiles of the render output;
an encoder configured to encode one or more rendering tiles of a render output generated by the rendering circuit using a compression unit size and/or shape that a rendering configuration used by the rendering circuit to generate the one or more rendering tiles of the render output was selected based on; and
an accumulation buffer configured to accumulate render output data generated by the rendering circuit for one or more compression units, and provide a complete compression unit to the encoder for encoding;
wherein the accumulation buffer is configured to provide a complete compression unit to the encoder for encoding by:
determining whether the accumulation buffer has not accumulated all of the render output data for the compression unit; and
when it is determined that the accumulation buffer has not accumulated all of the render output data for the compression unit:
requesting the render output data for the compression unit that the accumulation buffer has not accumulated from a memory system; and
combining render output data returned from the memory system with render output data for the compression unit that the accumulation buffer has accumulated so as to provide a complete version of the compression unit for encoding.

* * * * *